(12) United States Patent
Yamamura et al.

(10) Patent No.: US 11,183,918 B2
(45) Date of Patent: Nov. 23, 2021

(54) ABNORMALITY DETERMINATION SYSTEM

(71) Applicant: DENSO CORPORATION, Kariya (JP)

(72) Inventors: Masanori Yamamura, Kariya (JP);
Taro Hirai, Kariya (JP)

(73) Assignee: DENSO CORPORATION, Kariya (JP)

(*) Notice: Subject to any disclaimer, the term of this patent is extended or adjusted under 35 U.S.C. 154(b) by 11 days.

(21) Appl. No.: 16/508,583

(22) Filed: Jul. 11, 2019

(65) Prior Publication Data

US 2020/0021185 A1    Jan. 16, 2020

(30) Foreign Application Priority Data

Jul. 12, 2018  (JP) .............................. JP2018-132604
Mar. 1, 2019   (JP) .............................. JP2019-037367

(51) Int. Cl.
| | |
|---|---|
| *H02M 1/36* | (2007.01) |
| *H02H 1/00* | (2006.01) |
| *H02M 1/08* | (2006.01) |
| *H02M 7/5387* | (2007.01) |
| *H02P 27/06* | (2006.01) |

(52) U.S. Cl.
CPC ............ *H02M 1/36* (2013.01); *H02H 1/0007* (2013.01); *H02M 1/08* (2013.01); *H02M 7/5387* (2013.01); *H02P 27/06* (2013.01)

(58) Field of Classification Search
None
See application file for complete search history.

(56) References Cited

U.S. PATENT DOCUMENTS

| | | | |
|---|---|---|---|
| 2012/0007551 A1* | 1/2012 | Song | ...................... B60L 50/60 |
| | | | 320/109 |
| 2017/0163201 A1* | 6/2017 | Nakamoto | ............ H02P 29/024 |
| 2018/0026539 A1* | 1/2018 | Kobayashi | ............ H02M 7/537 |
| | | | 323/271 |

FOREIGN PATENT DOCUMENTS

JP        5287705 B2    9/2013

* cited by examiner

*Primary Examiner* — Jeffrey A Gblende
(74) *Attorney, Agent, or Firm* — Oliff PLC

(57) ABSTRACT

In an abnormality determination system, when a drive signal is input and no shutdown signal for stopping gate drive of switching elements is input, a signal switching section outputs the drive signal to a bridge circuit. When a shutdown signal is input, the signal switching section stops output of the drive signal and activates a shutdown function of an inverter. An abnormality determination section determines an abnormality in the shutdown function. When a power source relay is opened, a control unit drives the bridge circuit to start a discharge process of discharging electric charge from a smoothing capacitor, and activates the shutdown function during execution of the discharge process. When it is determined that a directly or indirectly detected voltage of the smoothing capacitor has dropped during operation of the shutdown function, the abnormality determination section determines that the shutdown function is abnormal.

8 Claims, 16 Drawing Sheets

ABNORMALITY DETERMINATION SYSTEM

CROSS-REFERENCE TO RELATED APPLICATIONS

This application is based on and claims the benefit of priority from earlier Japanese Patent Application No. 2018-132604 filed Jul. 12, 2018 and Japanese Patent Application No. 2019-37367 filed Mar. 1, 2019, the descriptions of which are incorporated herein by references.

BACKGROUND

Technical Field

The present disclosure relates to an abnormality determination system that determines an abnormality in a shutdown function of an inverter.

Related Art

There has been conventionally known a device in an inverter driving a rotary electrical machine to determine an abnormality in a shutdown function of stopping gate drive of a switching element.

SUMMARY

As an aspect of the embodiment, an abnormality determination system is provided which includes: at least one inverter that includes: a bridge circuit in which a plurality of switching elements are bridge-connected; a smoothing capacitor that is provided at an input part of the bridge circuit; and a control unit that controls driving of the bridge circuit, and converts direct-current power input from a direct-current power supply source to the bridge circuit to alternating-current power, and supplies the alternating-current power to a rotary electrical machine; and at least one power source relay that is provided between the direct-current power supply source and the smoothing capacitor and is capable of shutting off power supply from the direct-current power supply source to the bridge circuit. The control unit includes: a gate command section that generates a drive signal for driving gates of the plurality of switching elements in the bridge circuit; a signal switching section that, when the drive signal is input and no shutdown signal for stopping gate drive of the plurality of switching elements of the bridge circuit is input, outputs the drive signal to the bridge circuit, and when the shutdown signal is input, stops output of the drive signal and activates the shutdown function of the inverter; and an abnormality determination section that determines an abnormality in the shutdown function. When the power source relay is opened, the control unit drives the bridge circuit to start a discharge process of discharging electric charge from the smoothing capacitor, and activates the shutdown function during execution of the discharge process, and when it is determined that a directly or indirectly detected voltage of the smoothing capacitor has dropped during operation of the shutdown function, the abnormality determination section determines that the shutdown function is abnormal.

DETAILED DESCRIPTION OF THE PREFERRED EMBODIMENTS

Figure 1:
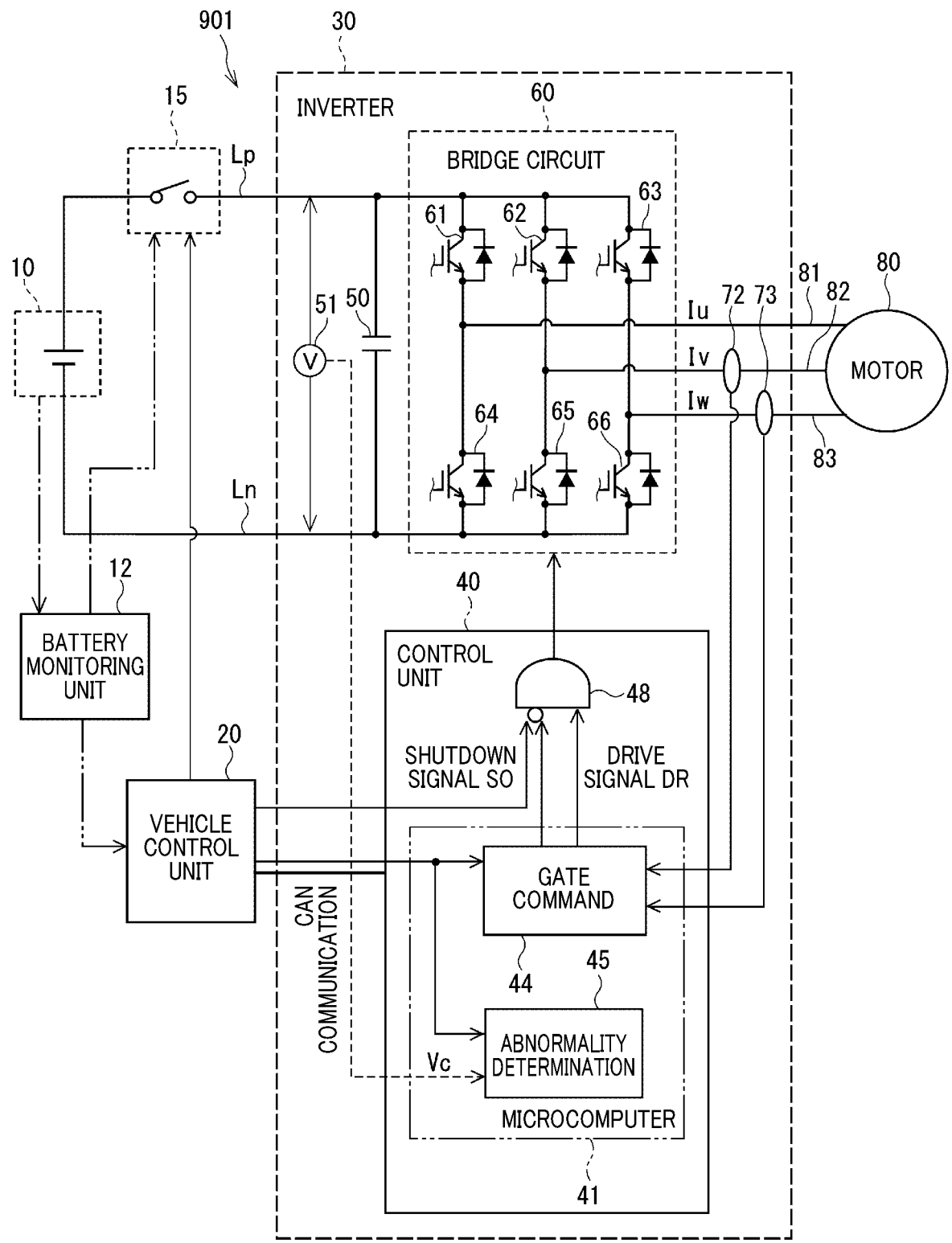
FIG. 1 is a diagram illustrating an overall configuration of an abnormality determination system according to a first embodiment.

There has been conventionally known a device in an inverter driving a rotary electrical machine which determines an abnormality in a shutdown function of stopping gate drive of a switching element. For example, a driving apparatus for a vehicle disclosed in Japanese Patent No. 5287705 determines an abnormality in the shutdown function of shutting down a power converter after traveling of the vehicle.

A control unit for the driving apparatus outputs a drive command for causing a drive current to follow and a shutdown command for shutting down the power converter with higher priority than the drive command. The control unit determines that there is an abnormality in the shutdown function for shutting down the power converter when the drive current is detected while both the drive command and the shutdown command for shutting down the power converter have been output.

In the following description, the term "approximately zero" relating to current means "approximately zero [A]", which indicates a current in a range where the value of the current is substantially regarded as "zero [A]" in consideration of device resolution and detection error. The command for allowing a drive current to flow is generally determined in such a manner as to control the drive state with reference to the output values of two phase current sensors. According to the device described in Japanese Patent No. 5287705, when the output value of the current sensor is approximately zero, the shutdown function is determined as normal, and when the output value of the current sensor is larger than approximately zero or smaller than approximately zero, the drive current is flowing and the shutdown function is determined as abnormal.

For example, suppose that, out of current sensors of two phases, V phase and W phase, an "approximately zero sticking fault" has occurred in the V-phase current sensor. In this case, even if the drive current flows through a current path from the U phase to the V phase, the shutdown function is determined as normal because the output of the V-phase current sensor is approximately zero. In addition, when the "approximately zero sticking fault" has occurred in both the V-phase and W-phase current sensors are, the shutdown function is determined as normal even if the drive current flows through any of the phases. Therefore, it is not possible to correctly detect an abnormality in the shutdown function.

In the second embodiment described in Japanese Patent No. 5287705, the shutdown function is determined as abnormal when a voltage drop occurs in a smoothing capacitor and flow of a drive current is detected. That is, even in the event of a voltage drop in the smoothing capacitor, the abnormality in the shutdown function cannot be correctly detected with the "approximately zero sticking fault" of the current sensor of one or more phases. This is similar to the case in which the voltage of the smoothing capacitor is not used for diagnosis.

The present disclosure has been devised in light of the foregoing circumstances. An object of the present disclosure is to provide an abnormality determination system that is capable of detecting an abnormality in the shutdown function even in the event of the approximately zero sticking fault in a current sensor.

Hereinafter, a plurality of embodiments of an abnormality determination system will be described with reference to the drawings. Substantially identical components in the plurality of embodiments or substantially identical steps in the flowcharts will be given identical reference signs or identical step numbers and redundant description thereof will be omitted. In addition, first to eighth embodiments will be collectively called "present embodiment". The abnormality determination system in the present embodiment is mounted in a hybrid automobile or an electric automobile including a motor that is a "rotary electrical machine" as a power source.

During normal running of the vehicle, the abnormality determination system converts direct-current power of a battery as a "direct-current power supply source" to alternating-current power and supplies the same to an alternating-current motor. After stop of the vehicle, when a ready state is turned off, and a power source relay provided between the battery and the inverter is opened (that is, turned off), the abnormality determination system cooperates with a vehicle control unit to diagnose an abnormality in a shutdown function. The "abnormality in the shutdown function" means an abnormality in a shutdown signal for stopping a gate of a switching element constituting a bridge circuit in the inverter.

(First Embodiment)

An abnormality determination system in the first embodiment will be described with reference to FIGS. 1 to 7. FIG. 1 illustrates an overall configuration of an abnormality determination system 901 that supplies electrical power from one inverter 30 to a three-phase alternating-current motor 80. The abnormality determination system 901 mainly includes the inverter 30 and a power source relay 15.

The inverter 30 includes a bridge circuit 60 in which a plurality of switching elements 61 to 66 are bridge-connected, a smoothing capacitor 50 that is provided to an input part of the bridge circuit, and a control unit 40 that controls driving of the bridge circuit. As above, herein, not only the bridge circuit 60 is called "inverter" but the bridge circuit 60, the smoothing capacitor 50, and the control unit 40 are collectively defined as "inverter". The inverter 30 converts direct-current power input from a battery 10 as a "direct-current power supply source" to the bridge circuit 60, to alternating-current power and supplies the same to the motor 80 as a "rotary electrical machine". The power source relay 15 is provided between the battery 10 and the smoothing capacitor 50 to shut off power supply from the battery 10 to the bridge circuit 60.

Subsequently, the elements will be described in detail. The battery 10 is a chargeable/dischargeable secondary battery such as a lithium-ion battery, which is a so-called high-voltage battery that can store a high voltage of hundreds of volts. However, the high-voltage battery will be denoted as simply "battery 10" because no mention will be made herein to an auxiliary battery as a so-called low-voltage battery. A positive electrode of the battery 10 is connected to a high-potential electrode of the smoothing capacitor 50 through a direct-current bus line Lp, and a negative electrode of the battery 10 is connected to a low-potential electrode of the smoothing capacitor 50 through a ground line Ln. The charging amount and temperature of the battery 10 are monitored by a battery monitoring unit 12.

The power source relay 15 is provided on the direct-current bus line Lp between the positive electrode of the battery 10 and the high-potential electrode of the smoothing capacitor 50 as illustrated in FIG. 1, for example. The power source relay may be provided so as to straddle the direct-current bus line Lp and the ground line Ln like the system main relay described in Japanese Patent No. 5287705, and may be combined with a pre-charge relay for preventing an inrush current at the closing time. The power source relay 15 is opened or closed by a vehicle control unit 20 performing a centralized control of behavior of the entire vehicle or by the battery monitoring unit 12. When the battery monitoring unit 12 operates the power source relay 15, the information on the operation is provided to the vehicle control unit 20.

In the present embodiment applied to a vehicle, typically, when a ready state of the power switch of the vehicle is turned on, the power source relay is turned on, that is, closed. In the running state of the vehicle including a temporary stop, electric charge is accumulated in the smoothing capacitor 50. When the vehicle is stopped and the ready state of the power switch is turned off, the power source relay 15 is turned off, that is, opened. After that, to ensure electrical safety during parking, in general, a discharge process is performed to discharge remaining charge from the smoothing capacitor 50.

The bridge circuit 60 of the inverter 30 has six bridge-connected switching elements 61 to 66 of upper and lower arms. The switching elements 61, 62, and 63 are respectively switching elements of U phase, V phase, and W phase of the upper arm, and the switching elements 64, 65, and 66 are respectively switching elements of U phase, V phase, and W phase of the lower arm. The switching elements 61 to 66 are configured by IGBTs, for example, and have reflux diodes connected in parallel to permit a current flowing from the low-potential side to the high-potential side.

Hereinafter, motor control during normal running of the vehicle is called "normal control". During the normal control, the bridge circuit 60 converts direct-current power to three-phase alternating-current power by operating the switching elements 61 to 66 according to a gate signal output from the control unit 40. Then, the bridge circuit 60 applies phase voltages corresponding to voltage commands calculated by the control unit 40 to respective phase windings 81, 82, and 83 of the motor 80.

The smoothing capacitor 50 smooths the direct-current voltage input to the bridge circuit 60. In the following description, the inter-electrode voltage of the smoothing capacitor 50, in other words, the voltage of the direct-current bus line Lp with reference to the potential of the ground line Ln will be referred to as "capacitor voltage Vc". In the first embodiment, a voltage sensor 51 is provided to directly detect the capacitor voltage Vc.

Current sensors detecting a phase current are provided in current paths connected to, out of the three phase windings 81, 82, and 83 of the motor 80, two, three, or more phase windings. In the example in FIG. 1, current sensors 72 and 73 respectively detecting phase currents Iv and Iw are provided in current paths connected to the V-phase winding 82 and the W-phase winding 83, and the remaining U-phase current Iu is estimated based on Kirchhoff's laws. In other embodiments, any two phase currents may be detected or the three phase currents may be detected.

Each of the detected phase currents is coordinate-converted to a dq-axis current and is fed back to a current command, whereby a voltage command is PI-computed. In the present embodiment, as described later, no current sensor is necessary and thus the bridge circuit 60 may be always driven by feedforward control without using a current detection value under normal control as well, for example.

The motor 80 is a permanent magnet synchronous three-phase alternating-current motor. The motor 80 of the present embodiment is a motor generator that includes a function of an electric motor to generate torque for driving drive wheels of a hybrid automobile and a function of a power generator to collect energy from torque transferred from the engine and the driving wheels by power generation. In motor control, generally, a rotation angle sensor is provided to detect a rotation angle for use in coordinate conversion computation and the like, though not illustrated in FIG. 1 or described herein.

The control unit 40 includes a microcomputer 41 that has a gate command section 44 and an abnormality determination section 45, and an AND circuit 48 as a "signal switching section". The microcomputer 41 contains a CPU, a ROM, an I/O unit, and a bus line connecting these components, though not illustrated in the drawings. The microcomputer 41 performs control through software processing by the CPU executing a pre-stored program and through hardware processing by a dedicated electronic circuit. The vehicle control unit 20 and the control unit 40 are communicable to each other via a network such as CAN communication.

During normal control, the microcomputer 41 performs general motor control by vector control and the like. Specifically, the microcomputer 41 subjects a dq-axis voltage command computed by a controller to three-phase conversion, thereby computing a three-phase voltage command. The microcomputer 41 further subjects the three-phase voltage command to PWM modulation by a modulator and outputs a gate command. In current feedback control, the controller performs PI control of the current detection value to follow the current command, thereby computing a dq-axis voltage command. In voltage feedforward control, the controller computes the dq-axis voltage command calculated from the current command by a voltage equation, for example. The mechanism of the general motor control as described above is a well-known technique, and thus detailed description thereof and illustration of signal inputs and outputs will be omitted.

In the present embodiment, particularly, the gate command section 44 of the microcomputer 41 generates a drive signal DR for driving the gates of the plurality of switching elements 61 to 66 in the bridge circuit 60. The abnormality determination section 45 determines an abnormality in a shutdown function described later, based on a change in the capacitor voltage Vc at the time of gate shutdown. Further, as described later, the abnormality determination section 45 determines an abnormality in the discharge function of the inverter 30 based on a change in the capacitor voltage Vc at the time of the discharge process.

When the power source relay 15 is opened by operation of the vehicle control unit 20 or the battery monitoring unit 12, the vehicle control unit 20 transmits a discharge command to the gate command section 44 of the microcomputer 41 through the CAN communication.

Accordingly, the drive signal DR is input from the gate command section 44 to one input terminal of the AND circuit 48. In addition, a shutdown signal SO generated by the microcomputer 41 of the AND circuit 48 or the vehicle control unit 20 is input in the negative to the other input terminal of the AND circuit 48. The shutdown signal SO is a signal for stopping the gate drive of the plurality of switching elements 61 to 66 in the bridge circuit 60.

That is, when the drive signal DR is input and the shutdown signal SO is not input, the AND circuit 48 outputs the drive signal DR to the bridge circuit 60. At that time, the control unit 40 can activate the switching elements 61 to 66 of the bridge circuit 60 to perform a discharge process.

When the drive signal DR is not input or the shutdown signal SO is input, the AND circuit 48 does not output the drive signal DR. Therefore, when the shutdown signal SO is input from the microcomputer 41 or the vehicle control unit 20, the AND circuit 48 stops output of the drive signal DR. Accordingly, stopping the gate drive of the bridge circuit 60 regardless of the gate command, that is, the operation of fixing the gates in an off state will be referred to as "activating the shutdown function of the inverter 30". The control unit 40 can interrupt the discharge of the smoothing capacitor 50 by activating the shutdown function of the inverter 30 during execution of the discharge process.

Figure 2:
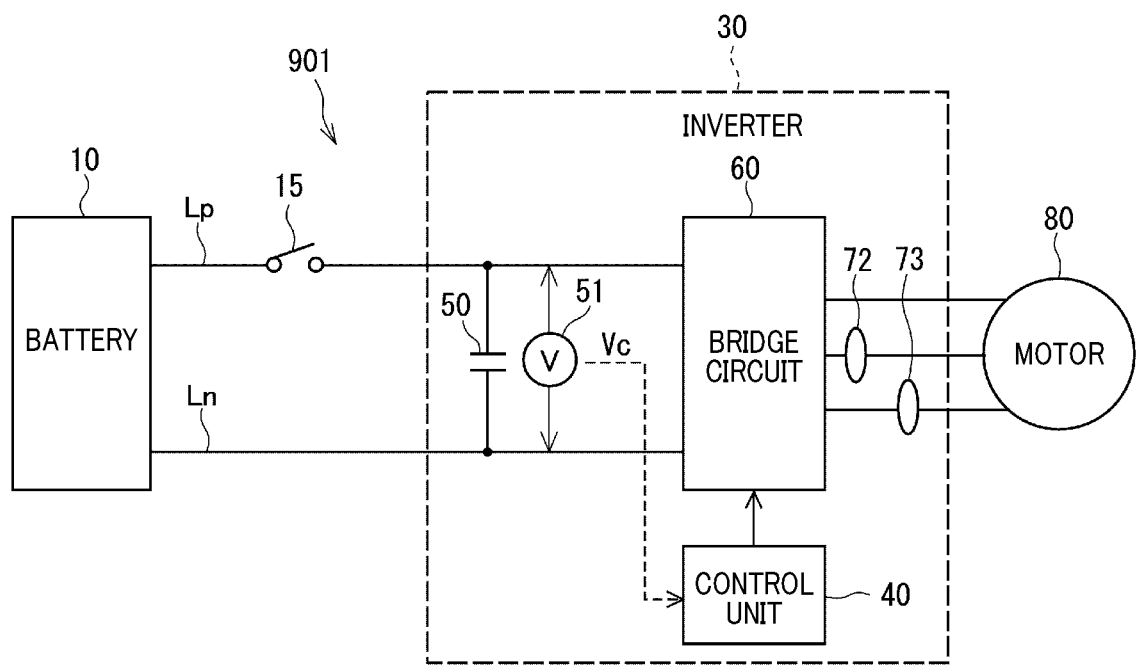
FIG. 2 is a simplified diagram of the system configuration in FIG. 1.
Figure 3:
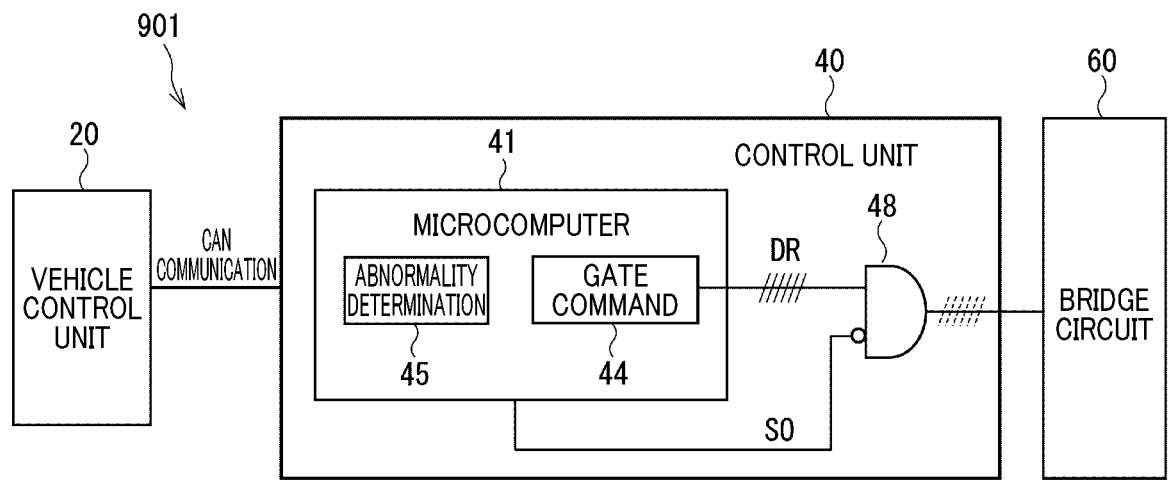
FIG. 3 is a diagram illustrating a configuration related to a drive signal and a shutdown signal according to the first embodiment.

FIG. 2 is a simplified diagram of the system configuration in FIG. 1. FIG. 3 is a diagram illustrating a communication configuration related to the drive signal DR and the shutdown signal SO in the vehicle control unit 20 and the control unit 40. FIGS. 2 and 3 are diagrams illustrating a basic configuration of the first embodiment. In relation to the second and subsequent embodiments, differences in configuration from the first embodiment will be described in the drawings conforming to FIGS. 2 and 3. The components not illustrated in the drawings of the following embodiments will be interpreted in conformity with those illustrated in FIG. 1.

An abnormality in the shutdown signal SO would cause an inconvenience that the gate drive of the bridge circuit 60 cannot be stopped even in case of emergency. Thus, there is a demand for diagnosis of an abnormality in the shutdown signal SO. According to the technique disclosed in Japanese Patent No. 5287705 as a conventional technique, an abnormality in the shutdown function is determined based on output values of the two phase current sensors that detect drive currents. In the conventional technique, however, when the "approximately zero sticking fault" has occurred in any of the current sensors, an abnormality in the shutdown function cannot be correctly detected.

According to the conventional method by which an abnormality in the shutdown function is detected by using the two phase current sensors, the problem described above will arise due to insufficient coverage of the shutdown function check. When the shutdown function is abnormal and a current flows from the smoothing capacitor 50, energy is supplied from the direct-current bus line Lp to the inverter 30 even if part of the shutdown function has failed as described above.

A viewpoint of solving the problem is to prevent the insufficiency of the coverage by inspecting energy supply. The present embodiment focuses on the fact that energy supply can be inspected from a change in energy accumulated in the smoothing capacitor 50 at the time of discharge from the smoothing capacitor 50. The energy accumulated in the smoothing capacitor 50 is proportional to the square of the capacitor voltage Vc and thus the energy supply can be inspected by a change in the capacitor voltage Vc.

Accordingly, in the present embodiment, there is employed a solution of using the capacitor voltage Vc during discharge of charge from the smoothing capacitor 50 to check the shutdown function. Specifically, when the capacitor voltage Vc drops while the discharge process is performed and the shutdown signal SO is output, the abnormality determination section 45 determines that there is an abnormality in the shutdown function. That is, in the present embodiment, output values of the current sensors 72 and 73 are not used for an abnormality diagnosis but an abnormality in the shutdown function is determined only from a change in the energy accumulated in the smoothing capacitor 50. This ensures the detectability of an abnormality in the event of an approximately zero sticking fault in the current sensors 72 and 73.

Figure 4:
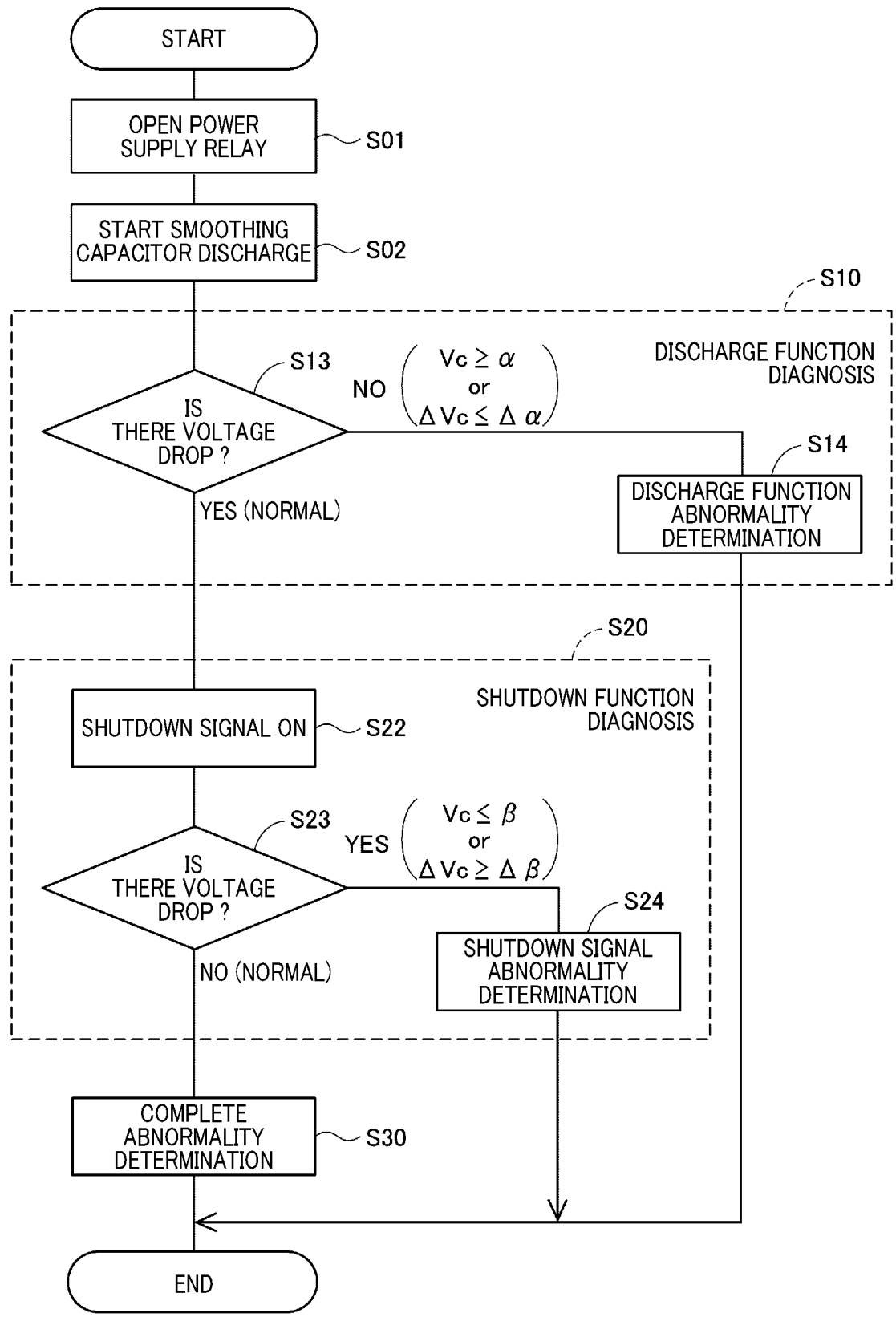
FIG. 4 is a flowchart of a diagnostic process according to the first embodiment.

FIG. 4 is a flowchart of a diagnostic process according to the first embodiment. In the flowchart, the symbol S represents "step". Among the steps illustrated in FIG. 4, S10 of a discharge function diagnosis includes S13 and S14, and step S20 of a shutdown function diagnosis includes S22 to S24. In the description of FIG. 4, the "abnormality in the shutdown function" will be referred to specifically as "abnormality in the shutdown signal SO".

When the power source relay is opened in S01, the control unit 40 starts the driving of the inverter 30 in S02, thereby starting discharge from the smoothing capacitor. Then, after the inverter 30 is driven to cause a current to flow to the motor 80, when the driving of the inverter 30 is normal, the charge of the smoothing capacitor 50 is discharged, whereby the capacitor voltage Vc decreases. However, when the driving of the inverter 30 is abnormal, the capacitor voltage Vc does not decrease.

Thus, the abnormality determination section 45 determines in S13 whether there is a drop in the capacitor voltage Vc during a period before the activation of the shutdown function. When there is a voltage drop, the abnormality determination section 45 determines that the discharge function of the inverter 30 is normal. When the capacitor voltage Vc is maintained without a voltage drop, the abnormality determination section 45 determines that the discharge function of the inverter 30 is abnormal. Specifically, when the capacitor voltage Vc is equal to or higher than a discharge threshold $\alpha$ or when a capacitor voltage drop amount $\Delta Vc$ is equal to or less than a discharge drop amount threshold $\Delta\alpha$, the abnormality determination section 45 makes a NO determination in S13 and the present process proceeds to S14. In S14, the abnormality determination section 45 determines that the discharge function of the inverter 30 is abnormal.

When a YES determination is made, that is, when it is determined that the discharge function is normal in S13, a shutdown function diagnosis in S20 is performed. After the shutdown signal SO is turned on in S22, the abnormality determination section 45 determines whether there is a drop in the capacitor voltage Vc in S23. When there is no voltage drop, the abnormality determination section 45 determines that the shutdown signal SO is normal, and when there is a voltage drop, the abnormality determination section 45 determines that the shutdown signal SO is abnormal. Specifically, when the capacitor voltage Vc is equal to or less than a shutdown threshold $\beta$, or when the capacitor voltage drop amount $\Delta Vc$ is equal to or more than a shutdown drop amount threshold $\Delta\beta$, the abnormality determination section 45 makes a YES determination in S23 and the present process proceeds to S24. In S24, the abnormality determination section 45 determines that the shutdown signal SO is abnormal.

A supplementary explanation on a method for determining the presence or absence of a voltage drop will be provided. The presence or absence of a voltage drop may be determined by sampling voltages at least at two timings and evaluating the voltage drop amount $\alpha Vc$, or may be determined from the fact that a voltage equal to or lower than the shutdown threshold has lasted for a predetermined period of time. When a discharge resistance is disposed in the direct-current bus line Lp, the voltage drop amount $\alpha Vc$ is evaluated considering a voltage drop due to discharge from the discharge resistance. Specifically, the temporal change ratio of capacitor energy due to the discharge from the discharge resistance becomes "voltage$^2$/resistance", which can be considered.

When a NO determination is made, that is, when it is determined that the shutdown signal SO is normal in S23, the abnormality determination section 45 terminates the abnormality diagnosis in S30. In the process illustrated in FIG. 4, the shutdown function diagnosis is performed after it is confirmed that the discharge function is normal. This avoids a false determination that the shutdown function is normal even in the event of an abnormality in the shutdown signal SO. However, when it has been already confirmed that the driving of the inverter 30 is normal by another diagnostic process, the discharge function diagnosis in S10 may be omitted. In this case, S02 can be followed by the step of turning on the shutdown signal in S22.

Figure 5:
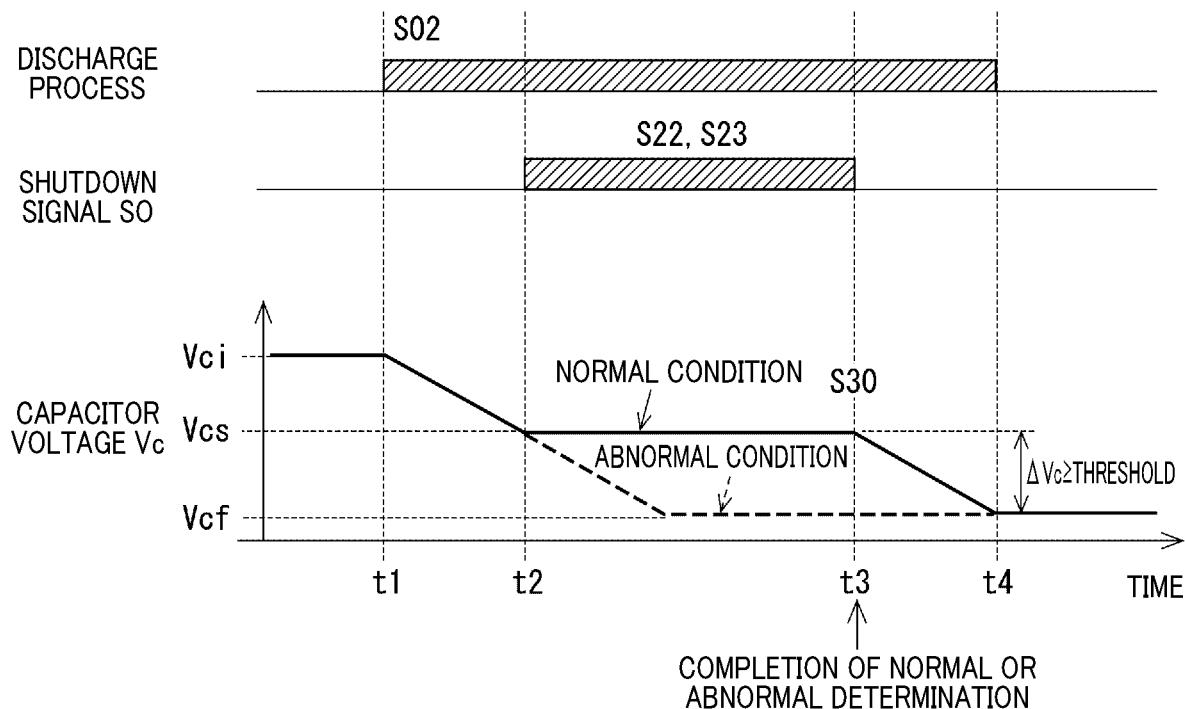
FIG. 5 is a time diagram of the diagnostic process according to the first embodiment.
Figure 6:
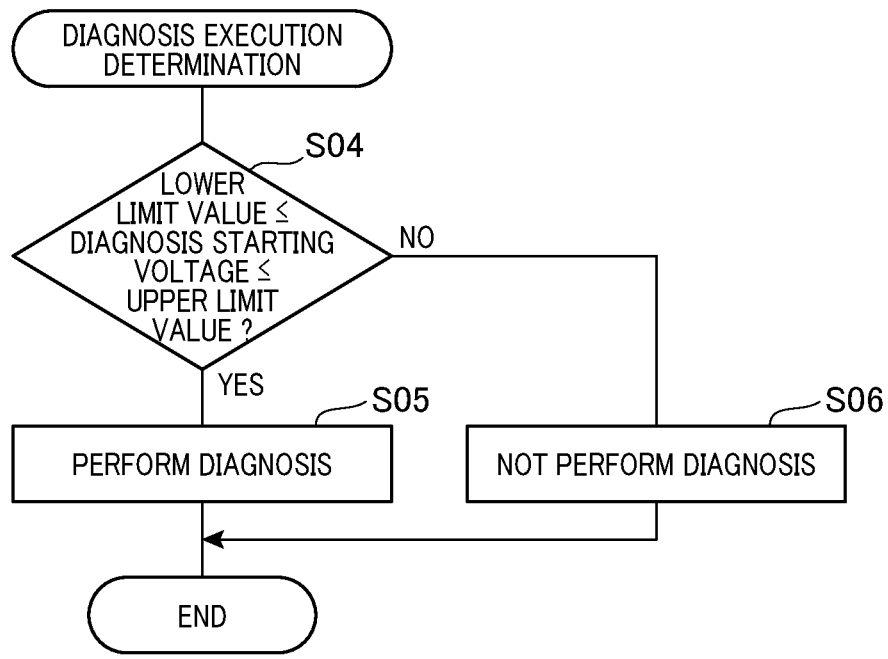
FIG. 6 is a flowchart of a diagnosis execution determination by a diagnosis starting voltage.

FIG. 5 is a time diagram illustrating a relationship between gate operation timings and changes in the capacitor voltage Vc in the diagnostic process according to the first embodiment. The periods illustrated in bars refer to a period during which the discharge process of the smoothing capacitor 50 is performed and a period during which the gate shutdown signal SO is output to the bridge circuit 60.

Reference signs "S02", "S22 and S23", and "S30" correspond to the step numbers illustrated in FIG. 4. No communication delay is considered in FIG. 5.

When the discharge process is started at time t1, the capacitor voltage Vc decreases from a voltage Vci at the start of the diagnosis, with a gradient according to the discharge rate. While the shutdown signal SO is output from time t2 to time t3, the capacitor voltage Vc is kept at a constant value Vcs as shown by a solid line when the shutdown signal SO is normal. At time t3, the abnormality determination section 45 determines that the shutdown signal SO is normal, thereby completing the abnormality diagnosis. When output of the shutdown signal SO is stopped, the capacitor voltage Vc decreases again. At time t4 when the capacitor voltage Vc decreases to a convergence value Vcf (ideally zero), the discharge process is terminated.

Meanwhile, when the shutdown signal SO is abnormal, the capacitor voltage Vc continues to decrease even after time t2 as shown by a broken line, and then reaches the convergence value Vcf. At time t3, the abnormality determination section 45 determines that the shutdown signal SO is abnormal based on the fact that the voltage drop amount ΔVc is equal to or more than the threshold, for example, thereby completing the abnormality diagnosis.

Hereinafter, other considerations in the abnormality diagnosis will be described.

<Current Vector at the Time of Inverter Drive>

The current vector at the time of inverter drive for discharge is desirably in a d-axis direction so as not to generate torque due to current. This makes it possible to avoid discomfort that the driver may feel when discharge is performed immediately after the vehicle stops. Even when the current sensors 72 and 73 have failed, driving the inverter 30 makes it possible to cause current to flow, thereby implementing discharge.

<Method for Outputting a Drive Command>

To control driving of the inverter 30 during discharge, if the current sensors 72 and 73 are normal, a current feedback control method may be used by which a voltage command is generated from a difference between a current command and a current detection value. Alternatively, a voltage feedforward control method may be used by which a voltage command is generated without using a current detection value.

<Switching of the Discharge Rate>

The discharge rate is desirably switched according to the capacitor voltage Vc. In particular, the discharge rate is accelerated in a high-voltage region higher than a voltage region used for a diagnosis, and the discharge rate is decelerated in a low-voltage region equal to or lower than the voltage region used for a diagnosis. Decelerating the discharge rate facilitates the setting of diagnosis conditions. Accelerating the discharge rate allows faster completion of discharge, thereby achieving safety improvement. The discharge rate may be switched stepwise according to the capacitor voltage Vc or continuously.

<Voltage Range at the Start of a Diagnosis>

It is preferably determined whether a diagnosis should be performed according to the capacitor voltage Vc at the start of the diagnosis. This is because, when the voltage Vc at the start of a diagnosis is lower than the lower limit value, the voltage will drop sharply due to discharge, which makes a normal diagnosis impossible. When the voltage Vc at the start of a diagnosis is higher than the upper limit value, the time elapsed until the completion of the diagnosis becomes longer, thereby threatening safety, which can be handled by performing no diagnosis. In the flowchart in FIG. 6, in S04, the control unit 40 determines whether the voltage at the start of a diagnosis is in the range of the lower limit value to the upper limit value. When a YES determination is made in step S04, the control unit 40 then determines to perform a diagnosis in S05. When a NO determination is made in S04, the control unit 40 determines not to perform a diagnosis in S06.

<Handling of a System in which Another Device is Connected to the Direct-Current Bus Line>

Figure 7:
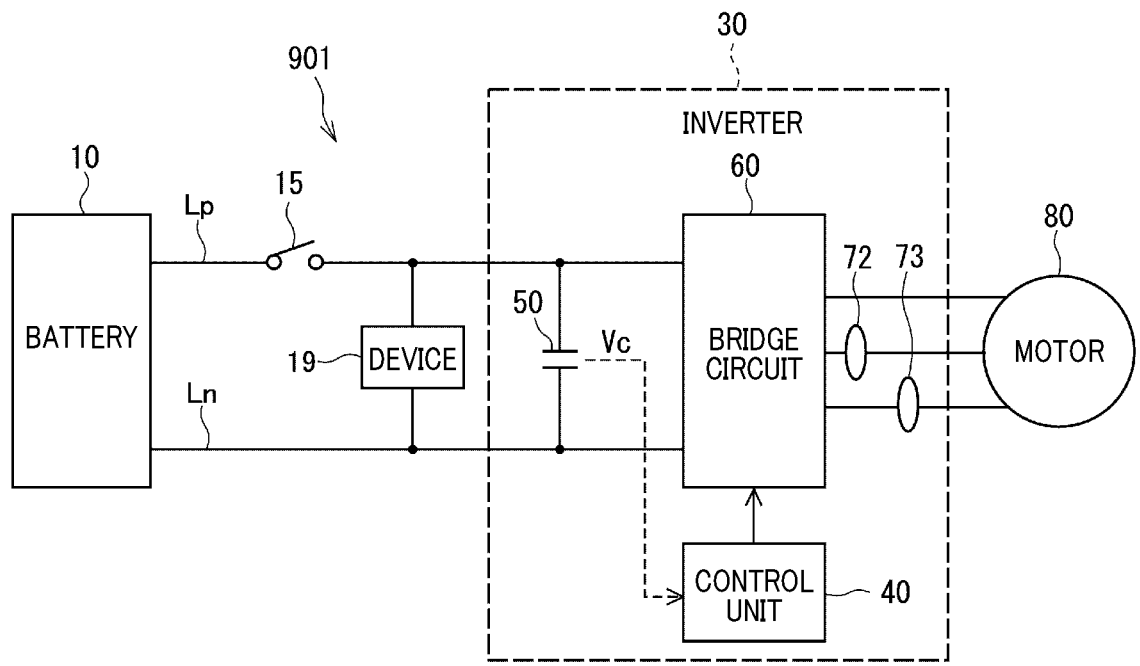
FIG. 7 is a diagram illustrating a system in which another device is connected in parallel to a smoothing capacitor.

As illustrated in FIG. 7, suppose that another device 19 is connected in parallel to the smoothing capacitor 50 and between the direct-current bus line Lp and the ground line Ln, so as to be nearer the inverter 30 than the power source relay 15 is. The other device 19 refers to a DCDC converter, an air-conditioner compressor, or the like, for example. In such a system, when the other device 19 is activated after the opening of the power source relay 15, the charge in the smoothing capacitor 50 is consumed by the other device 19, and thus a correct determination cannot be made in an abnormality determination. Therefore, it is necessary to stop the activation of the other device 19 before the opening of the power source relay 15. Particular configurations with connection of a boost converter will be described later in relation to seventh and eighth embodiments.

As described above, in the abnormality determination system 901 of the present embodiment, after the opening of the power source relay 15, when it is determined that the voltage Vc of the smoothing capacitor detected during the execution of the shutdown function has dropped, the abnormality determination section 45 determines that the shutdown function is abnormal. Since an abnormality in the shutdown function is determined only based on the capacitor voltage Vc without using the current values of the current sensors 72 and 73 as in the conventional technique described in Japanese Patent No. 5287705, an abnormality diagnosis of the shutdown function can be appropriately performed even if an approximately zero sticking fault has occurred in at least one of the current sensor 72 and 73.

In the abnormality determination system 901, when it is determined that the capacitor voltage Vc is maintained in a period between the start of the discharge process and the activation of the shutdown function, the abnormality determination section 45 determines that the discharge function of the inverter 30 is abnormal. Performing the shutdown function diagnosis after checking that the discharge function is normal makes it possible to avoid a false determination that the shutdown function is normal regardless of an abnormality in the shutdown signal SO.

(Second Embodiment)

Figure 8:
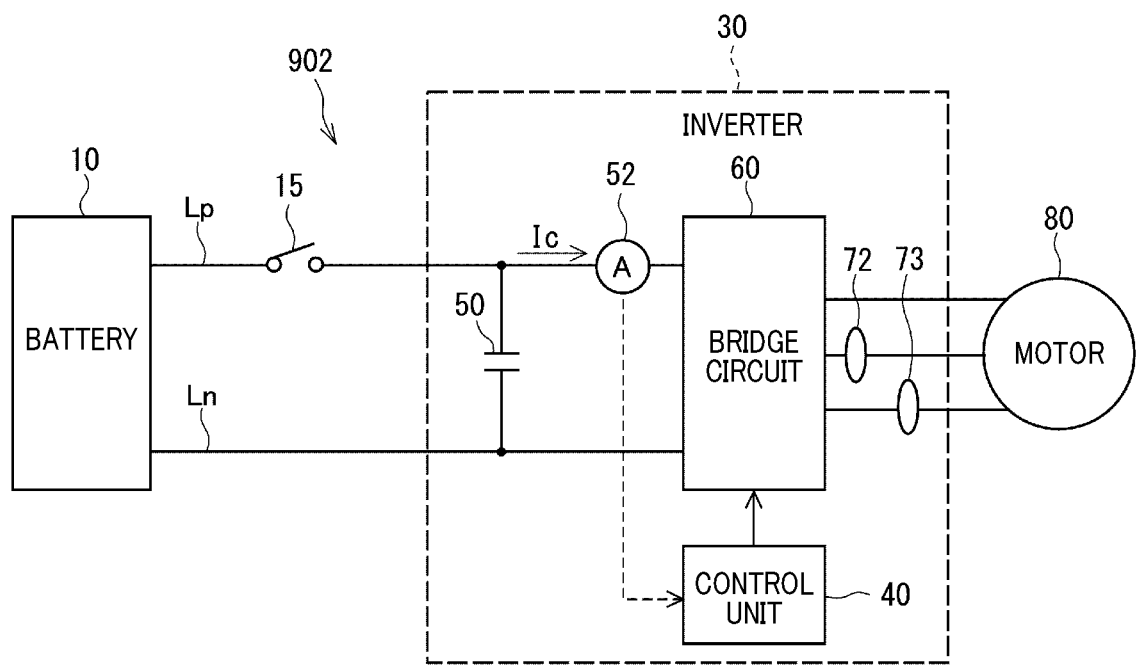
FIG. 8 is a diagram illustrating a configuration of an abnormality determination system according to a second embodiment.

FIG. 8 illustrates a second embodiment that is different from the first embodiment in a configuration for detecting a change in the capacitor voltage. An abnormality determination system 902 in the second embodiment includes a current sensor 52 instead of the voltage sensor 51 illustrated in FIGS. 1 and 2. The current sensor 52 is provided on a direct-current bus line Lp between a smoothing capacitor 50 and a bridge circuit 60 to detect a current Ic flowing from a high-potential electrode of the smoothing capacitor 50. The current Ic flowing out from the high-potential electrode of the smoothing capacitor 50 to the bridge circuit 60 correlates with the capacitor voltage Vc, and thus a change in the capacitor voltage Vc is indirectly detected in this configuration.

Specifically, when the output value of the current sensor 52 is approximately 0 A, it is determined that "there is no voltage drop", that is, a NO determination is made in S23 illustrated in FIG. 4, and it is determined that the shutdown function is normal. On the other hand, when the output value of the current sensor 52 is not approximately 0 A, it is determined that "there is a voltage drop", that is, a YES determination is made in S23 illustrated in FIG. 4, and it is determined that the shutdown function is abnormal. In this manner, an abnormality diagnosis of the shutdown function can be performed in the second embodiment as well as in the first embodiment.

However, an abnormality in the shutdown function may be erroneously determined in the event of a sticking fault of the current sensor 52. Thus, in order to prevent such an erroneous determination, it is preferred to check whether the current sensor 52 outputs a current value in the discharge process before the activation of the shutdown function. In the following embodiments, the capacitor voltage Vc may be detected by either a method using the voltage sensor 51 as in the first embodiment or a method using the current sensor 52 as in the second embodiment.

(Third Embodiment)

Figure 9:
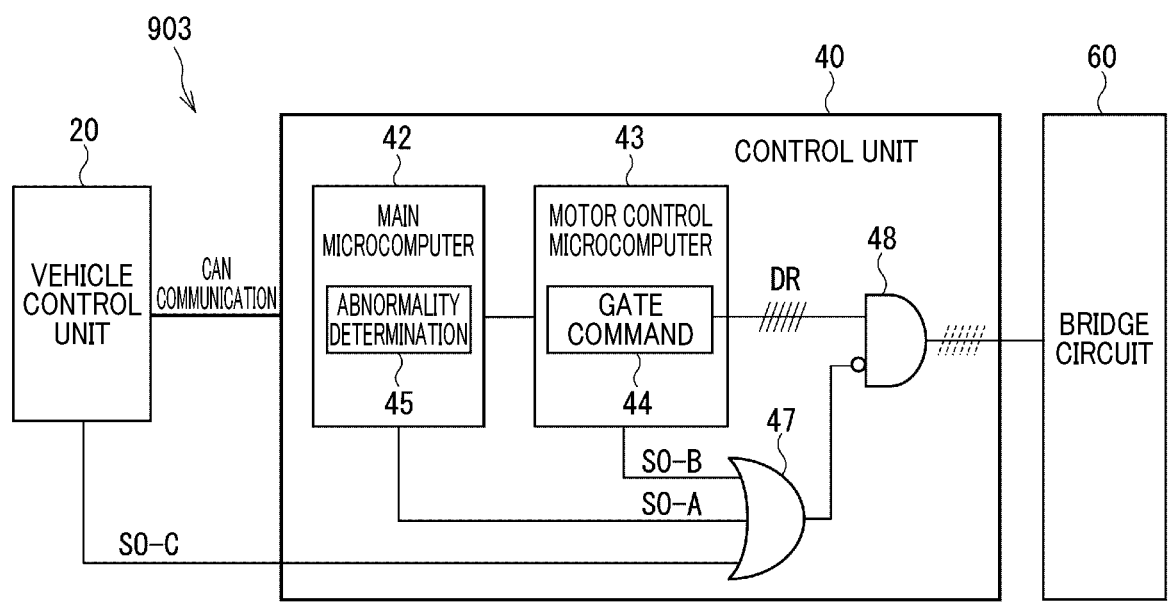
FIG. 9 is a diagram illustrating a configuration related to a drive signal and shutdown signals according to a third embodiment.

A third embodiment will be described with reference to FIGS. 9 to 11. As illustrated in FIG. 9, a plurality of shutdown signals are used in an abnormality determination system 903 in the third embodiment. The control unit 40 includes a main microcomputer 42 that performs centralized control of the inverter 30, a motor control microcomputer 43 that performs control related to driving of the motor 80, an OR circuit 47, and an AND circuit 48. The main microcomputer 42 includes the abnormality determination section 45, and the motor control microcomputer 43 includes the gate command section 44.

When the power source relay 15 is opened, a diagnostic command from the vehicle control unit 20 is transmitted to the main microcomputer 42 of the control unit 40 via CAN communication. Based on this, the main microcomputer 42 generates a main shutdown signal SO-A, and the motor control microcomputer 43 generates a motor control shutdown signal SO-B. In addition, the vehicle control unit 20 transmits a vehicle control unit control signal SO-C. When any one or more of the main shutdown signal SO-A, the motor control shutdown signal SO-B, and the vehicle control unit control signal SO-C are input, the OR circuit 47 outputs an ON signal indicating "presence of the shutdown signal".

When a drive signal DR is input from the motor control microcomputer 43 and no ON signal is input from the OR circuit 47, the AND circuit 48 outputs the drive signal DR to the bridge circuit 60. On the other hand, when the OR circuit 47 inputs an ON signal to the AND circuit 48, the AND circuit 48 does not output the drive signal DR to the bridge circuit 60, thereby activating the shutdown function.

Generating redundantly the plurality of shutdown signals SO-A, SO-B, and SO-C by the plurality of microcomputers 42 and 43 in the control unit 40 and the vehicle control unit 20 makes it possible to, even when the generation of any of the shutdown signals has failed, implement the shutdown function by the other shutdown signals. This improves reliability of ensuring the shutdown function.

Figure 10:
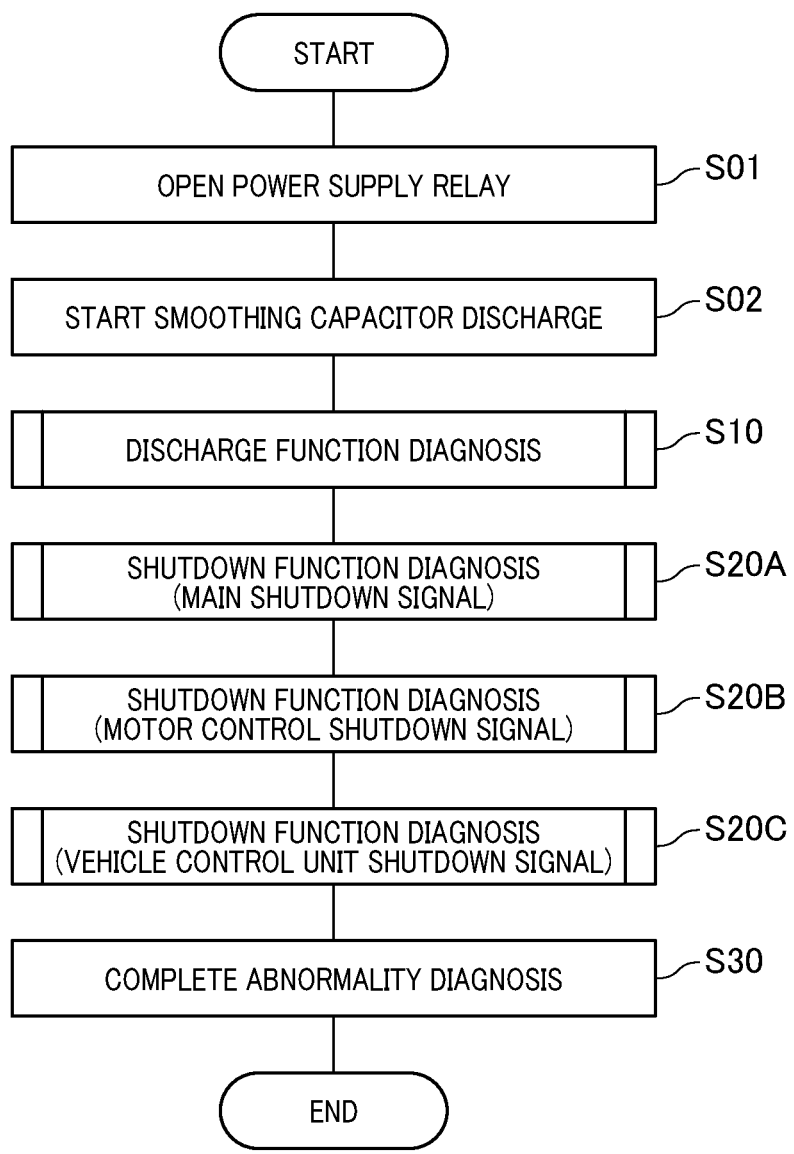
FIG. 10 is a flowchart of a diagnostic process according to the third embodiment.
Figure 11:
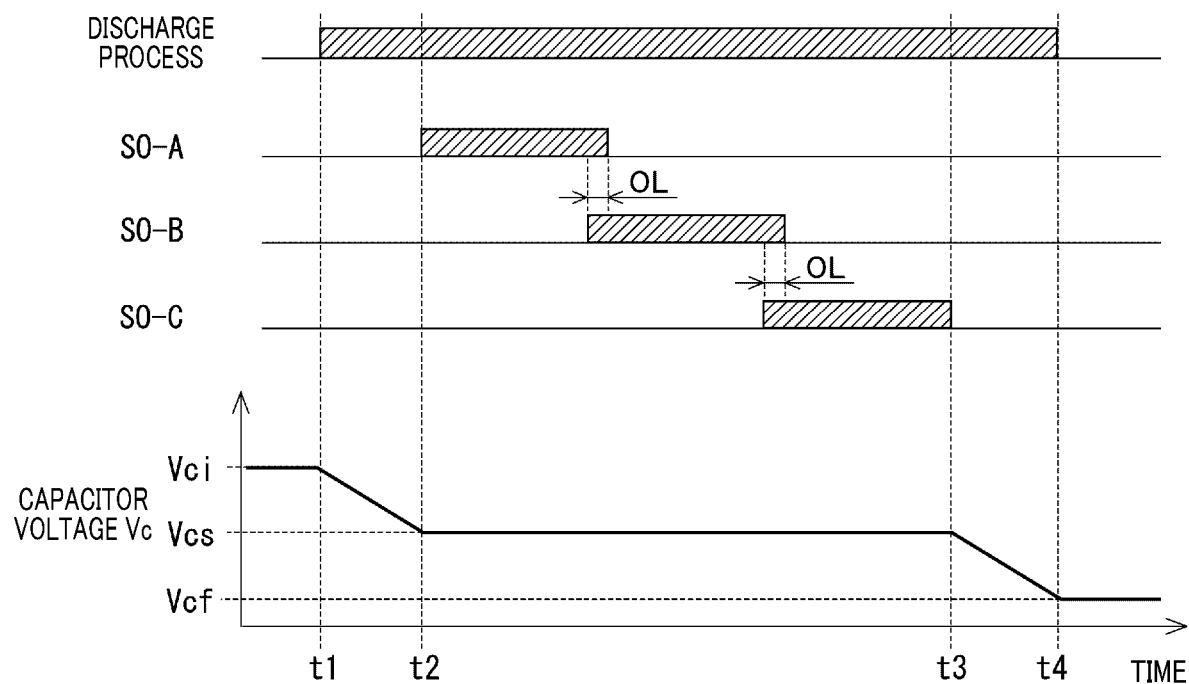
FIG. 11 is a time diagram of the diagnostic process according to the third embodiment.

The flowchart in FIG. 10 and the time chart in FIG. 11 illustrate a diagnostic process with a plurality of shutdown signals. When the power source relay is opened in S01 illustrated in FIG. 10, the control unit 40 starts discharge of the smoothing capacitor in S02, and performs a discharge function diagnosis in S10. Next, the control unit 40 performs a shutdown function diagnosis of the main shutdown signal SO-A in S20A, performs a shutdown function diagnosis of the motor control shutdown signal SO-B in S20B, and performs a shutdown function diagnosis of the vehicle control unit shutdown signal SO-C in S20C. When the diagnosis function diagnoses of all the shutdown signals are completed, the abnormality diagnosis is completed in S30.

When the plurality of shutdown signals are simultaneously subjected to an abnormality diagnosis, if any abnormality is detected, it is not possible to identify which of the shutdown signals is abnormal.

This is called "interference with abnormality detection." In the conventional technique described in Japanese Patent No. 5287705, for example, it is not identified which is abnormal, an emergency shutdown command HSDN from the HV-ECU or shutdown commands HSDN1# and HSDN2# from the control unit. That is, no consideration is given to interference with abnormality detection for the plurality of shutdown commands.

In contrast to this, in the third embodiment, the control unit 40 sequentially performs the diagnoses of the shutdown signals SO-A, SO-B, and SO-C. Each of the shutdown signals is turned off when the signal is not subjected to a diagnosis. That is, the abnormality determination section 45 determines an abnormality in the plurality of shutdown signals SO-A, SO-B, and SO-C based on a voltage drop in the smoothing capacitor 50 during a period during which each of the shutdown signals is applied in a mutually exclusive manner. Therefore, it is possible to avoid interference with abnormality detection.

As illustrated with the reference sign "OL" in FIG. 11, the ON periods of the shutdown signals preferably last to overlap each other. This is because, if the OFF period of any shutdown signal occurs, discharge is advanced to drop the capacitor voltage Vc, thereby narrowing the width of the voltage drop to be diagnosed. When all the shutdown signals SO-A, SO-B, and SO-C are normal, the capacitor voltage Vc is maintained at the constant value Vcs from time t2 to time t3.

Although any of the shutdown signals may be diagnosed first, it is preferred to turn on first the shutdown signal of a control unit or a microcomputer to make a determination for a "discharge function diagnosis". This shortens the communication delay time from the completion of the "discharge function diagnosis" to the turn-on of the shutdown signal. Therefore, it is possible to prevent unnecessary discharge of the smoothing capacitor 50 and increase the width of the voltage drop to be diagnosed in the subsequent diagnoses as much as possible.

(Fourth Embodiment)

Figure 12:
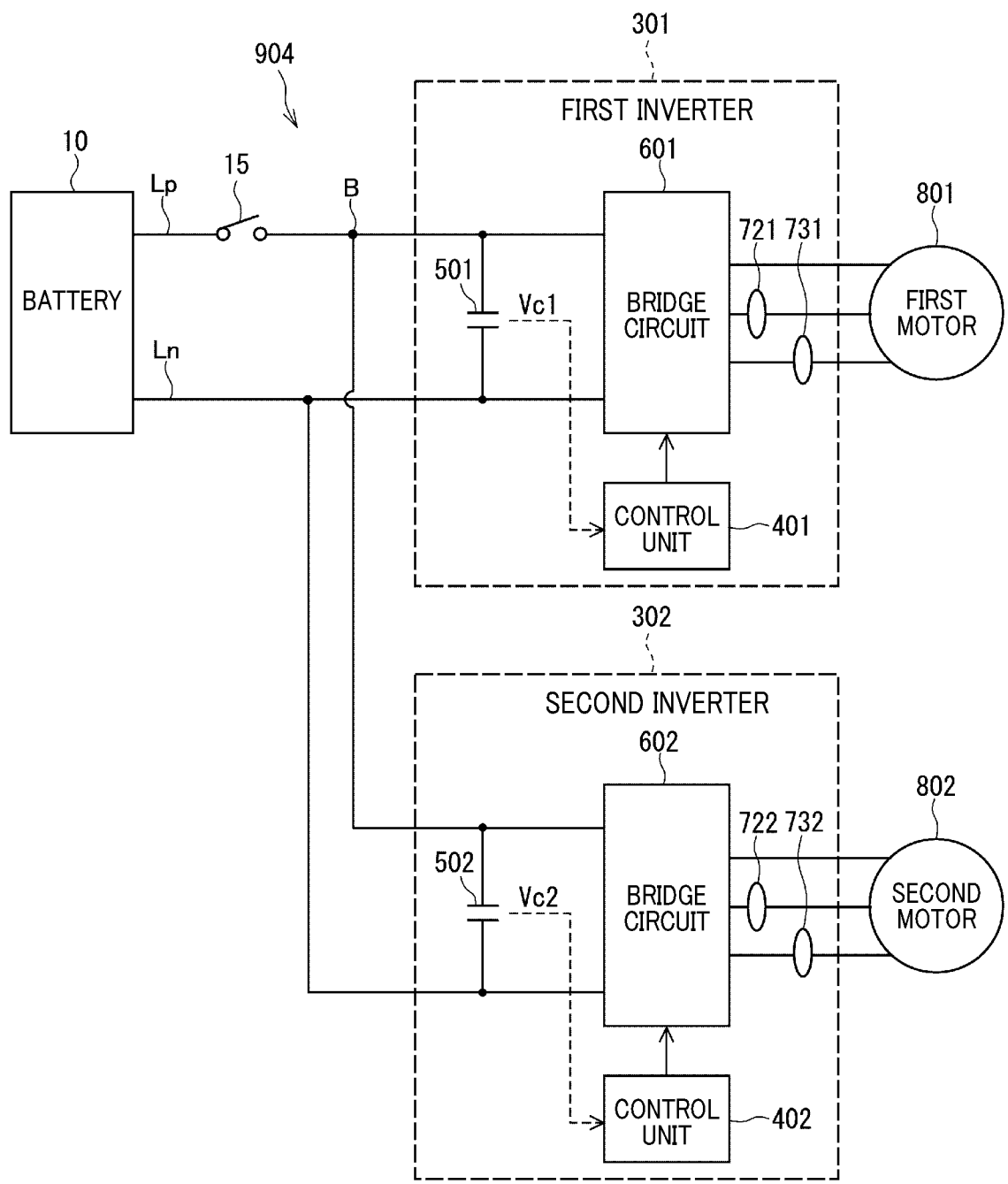
FIG. 12 is a diagram illustrating a configuration of an abnormality determination system according to a fourth embodiment.
Figure 13:
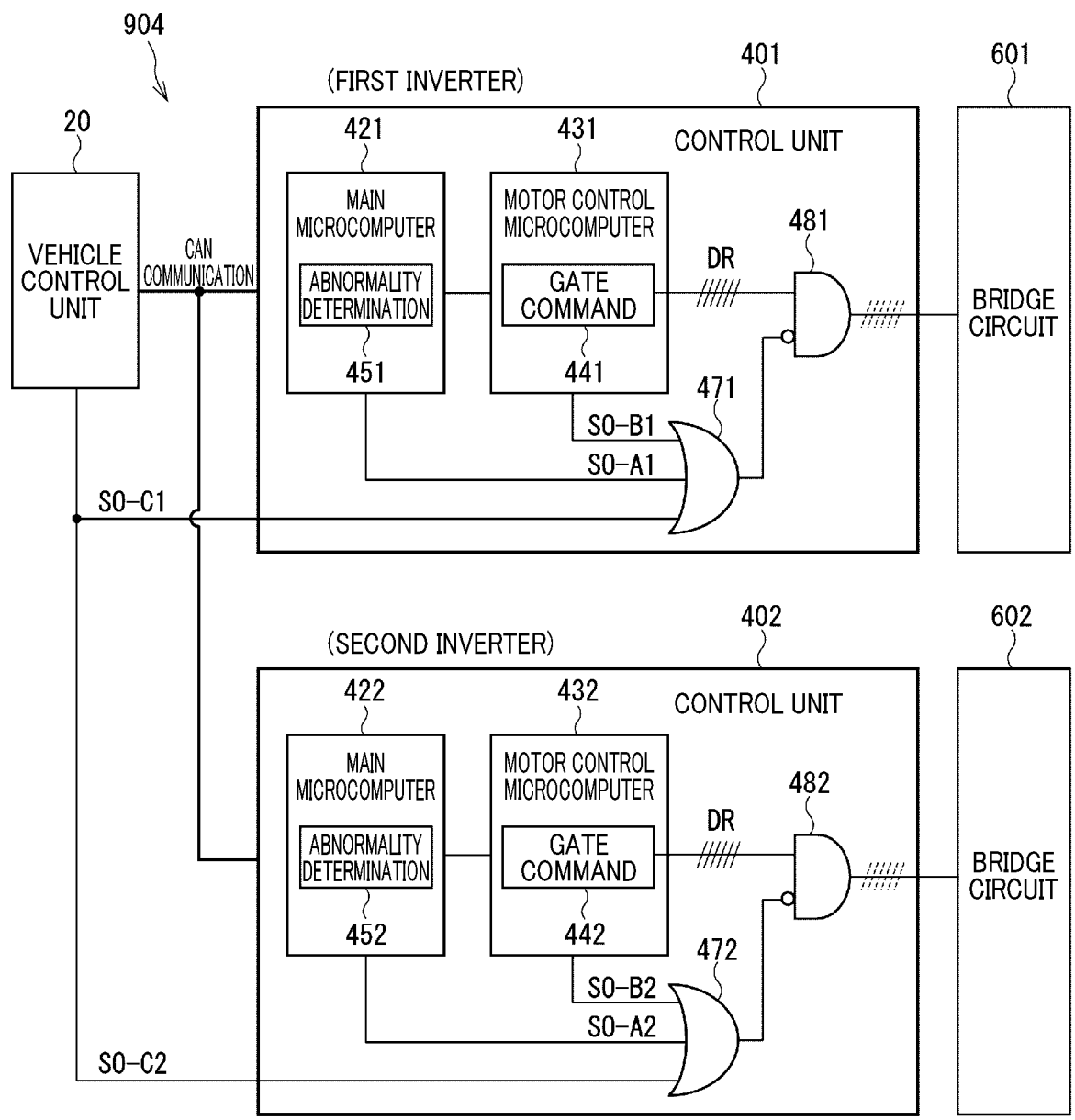
FIG. 13 is a diagram illustrating a configuration related to drive signals and shutdown signals according to the fourth embodiment.

Next, a configuration example of an abnormality determination system including a plurality of inverters as a fourth embodiment will be described with reference to FIGS. 12 to 14. As illustrated in FIG. 12, an abnormality determination system 904 in the fourth embodiment has a plurality of inverters 301 and 302 connected in parallel to the battery 10. The first inverter 301 supplies electric power to a first motor 801, and the second inverter 302 supplies electric power to a second motor 802. The first motor 801 and the second motor 802 may be configured as one dual-winding motor. The fourth embodiment is also applicable to a system including three or more inverters in the same manner.

As for reference signs of elements illustrated in FIG. 12, the number "1" is appended to the reference signs of elements of the first inverter 301, and the number "2" is appended to the reference signs of elements of the second inverter 302. A direct-current voltage of the battery 10 is input to bridge circuits 601 and 602 of the inverters 301 and 302 through a branch point B in the direct-current bus line Lp. The power source relay 15 is provided on the direct-current bus line Lp so as to be nearer the battery 10 than the branch point B to the inverters 301 and 302 is.

Shutdown signals are input to control units 401 and 402 of the inverters 301 and 302 to shut down the corresponding inverters. FIG. 13 illustrates an input/output configuration of the shutdown signals in the control units 401 and 402 of the inverters 301 and 302. FIG. 13 illustrates the configuration in which the plurality of shutdown signals are used for each of the inverters in conformity with the configuration of the third embodiment illustrated in FIG. 9. Alternatively, the fourth embodiment may be configured such that one shutdown signal is used for each of the inverters in conformity with the configuration of the first embodiment illustrated in FIG. 3. Main microcomputers 421 and 422 respectively includes abnormality determination sections 451 and 452, and motor control microcomputers 431 and 432 respectively include gate command sections 441 and 442.

When the power source relay 15 is opened, the vehicle control unit 20 transmits diagnostic commands to the main microcomputers 421 and 422 of the control units 401 and 402 via CAN communication. Based on this, the main microcomputers 421 and 422 respectively generate main shutdown signals SO-A1 and SO-A2, and the motor control microcomputers 431 and 432 respectively generate motor control shutdown signals SO-B1 and SO-B2. In addition, the vehicle control unit 20 transmits vehicle control unit control signals SO-C1 and SO-C2 to the control units 401 and 402. When any of the shutdown signals is input to the OR circuits 471 and 472, the AND circuits 481 and 482 output the shutdown signals to the bridge circuits 601 and 602 in priority to the drive signals DR1 and DR2.

Figure 14:
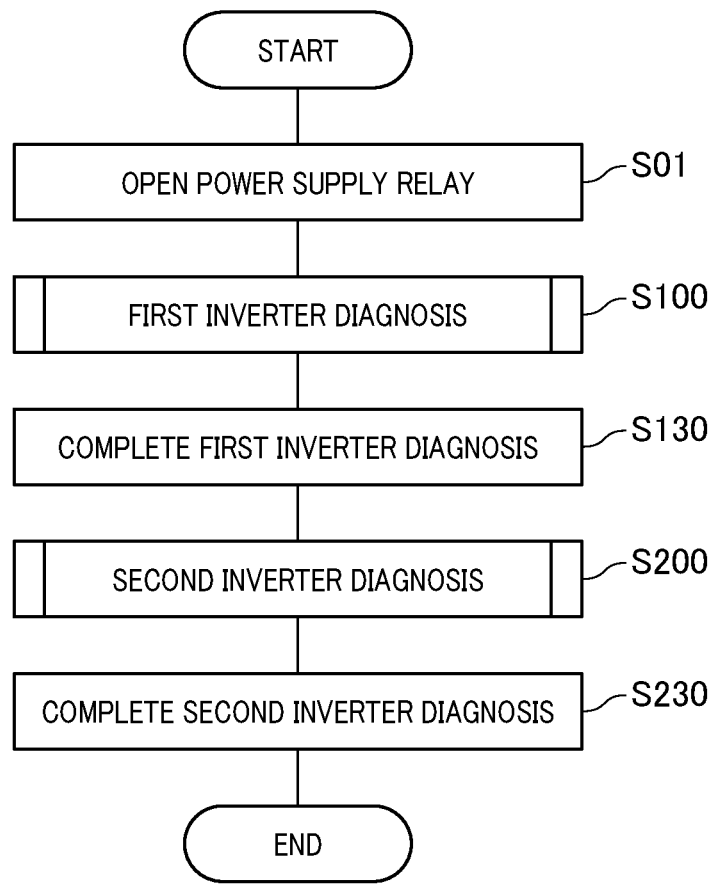
FIG. 14 is a flowchart of a diagnostic process according to the fourth embodiment.

FIG. 14 illustrates a flowchart of a diagnostic process in the fourth embodiment. Reference signs S100 and S200 in FIG. 14 indicate respective steps of "inverter diagnoses" including discharge processes and abnormality diagnoses of shutdown functions of the first inverter 301 and the second inverter 302. In the fourth embodiment, after the opening of the power source relay 15, the discharge processes and abnormality diagnoses of shutdown functions of the inverters 301 and 302 are performed one by one in sequence.

When the power source relay 15 is opened in S01, the control unit 401 of the first inverter 301 first performs the diagnosis of the first inverter in S100, and completes the diagnosis of the first inverter in S130. Next, the control unit 402 of the second inverter 302 performs the diagnosis of the second inverter in S200, and completes the diagnosis of the second inverter in S230. The order of diagnoses of the inverters 301 and 302 may be changed.

In the system configuration of the fourth embodiment, high-potential electrodes of smoothing capacitors 501 and 502 of the plurality of inverters 301 and 302 are connected with each other via the direct-current bus line Lp, and low-potential electrodes of the same are connected with each other via the ground line Ln. Accordingly, if the shutdown function of one of the plurality of inverters 301 and 302 is normal and the shutdown function of the other is abnormal, performing abnormality diagnoses of the inverters at the same time would cause a current to flow from the normal inverter to the abnormal inverter. Therefore, it becomes difficult to detect independently and correctly drops in capacitor voltages Vc1 and Vc2 of the inverters.

In the following description, the phenomenon in which a current flows between the plurality of inverters through the direct-current bus line Lp to mix the capacitor voltages Vc1 and Vc2 will be referred to as "interference with the capacitor voltages". In addition, the influence of the phenomenon on the abnormality detection of the inverters 301 and 302 will be referred to as "interference with abnormality detection".

According to the conventional technique in Japanese Patent No. 5287705, in the system configuration in which a common system main relay is provided for the plurality of inverters immediately behind the electrical storage device, motor currents MCRT1 and MCRT2 of the inverters are input to the current detection section without distinction of timing. That is, no consideration is given to the interference with the abnormality detection between the plurality of inverters. In contrast to this, in the fourth embodiment, the inverters 301 and 302 are sequentially diagnosed one by one, thereby making it possible to avoid the interference with the abnormality detection caused by the interference with the capacitor voltage Vc and perform correct diagnoses.

(Fifth Embodiment)

Figure 15:
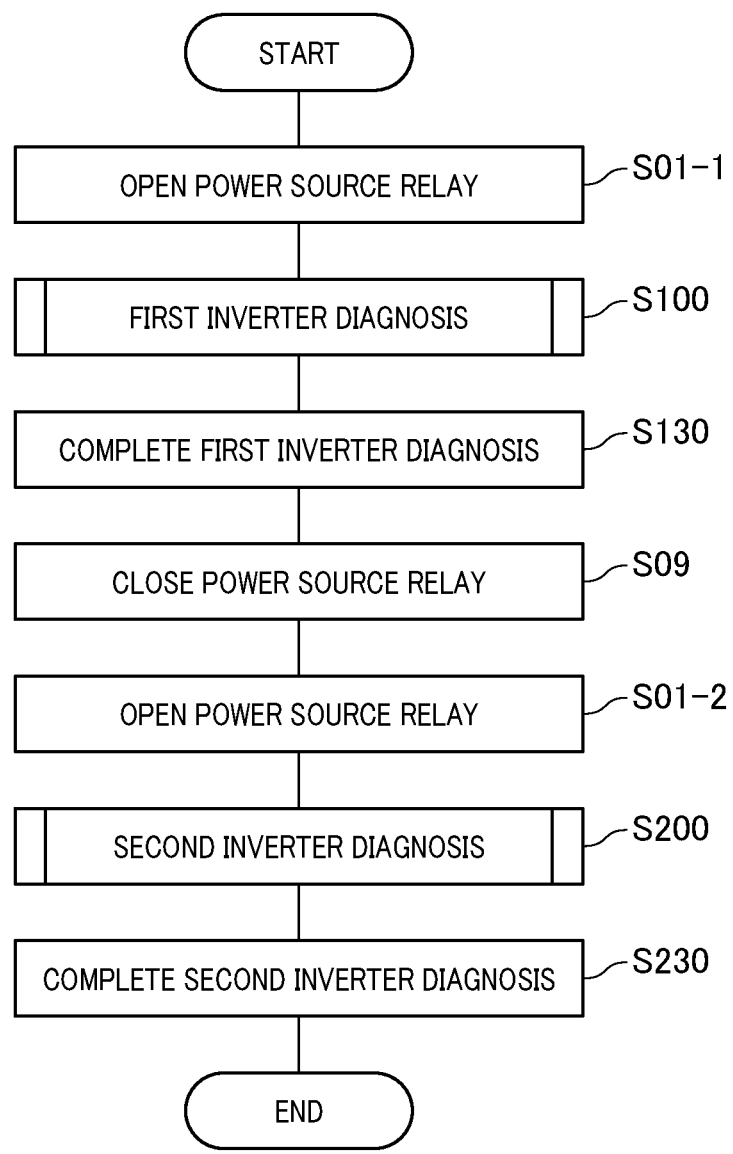
FIG. 15 is a flowchart of a diagnostic process according to a fifth embodiment.

FIG. 15 is a flowchart illustrating a diagnostic process of the fifth embodiment as another example of abnormality diagnosis in a system including a plurality of inverters as in the fourth embodiment. As for the system configuration in the fifth embodiment, FIGS. 12 and 13 will be referred to in common with the fourth embodiment. Control units 401 and 402 of inverters 301 and 302 perform a discharge process and an abnormality diagnose of shutdown functions of one or more inverters selected in sequence corresponding to one relay opening action.

In FIG. 15, step number "S01-1" indicates a first opening action of the power source relay 15 with reference to a certain point in time, "S01-2" indicates a second opening action of the power source relay 15 after the power source relay 15 was closed once. For example, the time at which the vehicle stops running and a ready state is turned off for the first time corresponds to S01-1, and then the time at which the ready state is turned on again and the vehicle runs, and the vehicle is stopped and then the ready state is turned off for the second time corresponds to S01-2.

When the power source relay 15 is opened for the first time in S01-1, the control unit 401 of the first inverter 301 performs a diagnosis of the first inverter in S100, and completes the diagnosis of the first inverter in S130. Then, the power source relay 15 is closed in S09. After that, when the power source relay 15 is opened for the second time in S01-2, the control unit 402 of the second inverter 302 performs a diagnosis of the second inverter in S200, and completes the diagnosis of the second inverter in S230. The order of the diagnoses of the inverters 301 and 302 may be changed.

In the fifth embodiment, as in the fourth embodiment, it is possible to avoid interference with abnormality detection at the diagnoses of the plurality of inverters 301 and 302. Also in the fifth embodiment, the dischargeable charge tolerance amount for one each inverter at one diagnosis increases, which makes it possible to ensure the large range of the voltage drop for use in the diagnosis. This widens the range of vehicle systems to which this diagnosis is applicable.

In a system including a plurality of inverters, the fourth embodiment and the fifth embodiment may be combined together to perform abnormality diagnoses. For example, when six inverters are to be diagnosed in sequence, two each of them may be diagnosed in sequence at every one relay opening action so that the diagnoses of the six inverters are completed by three relay opening actions.

(Sixth Embodiment)

Figure 16:
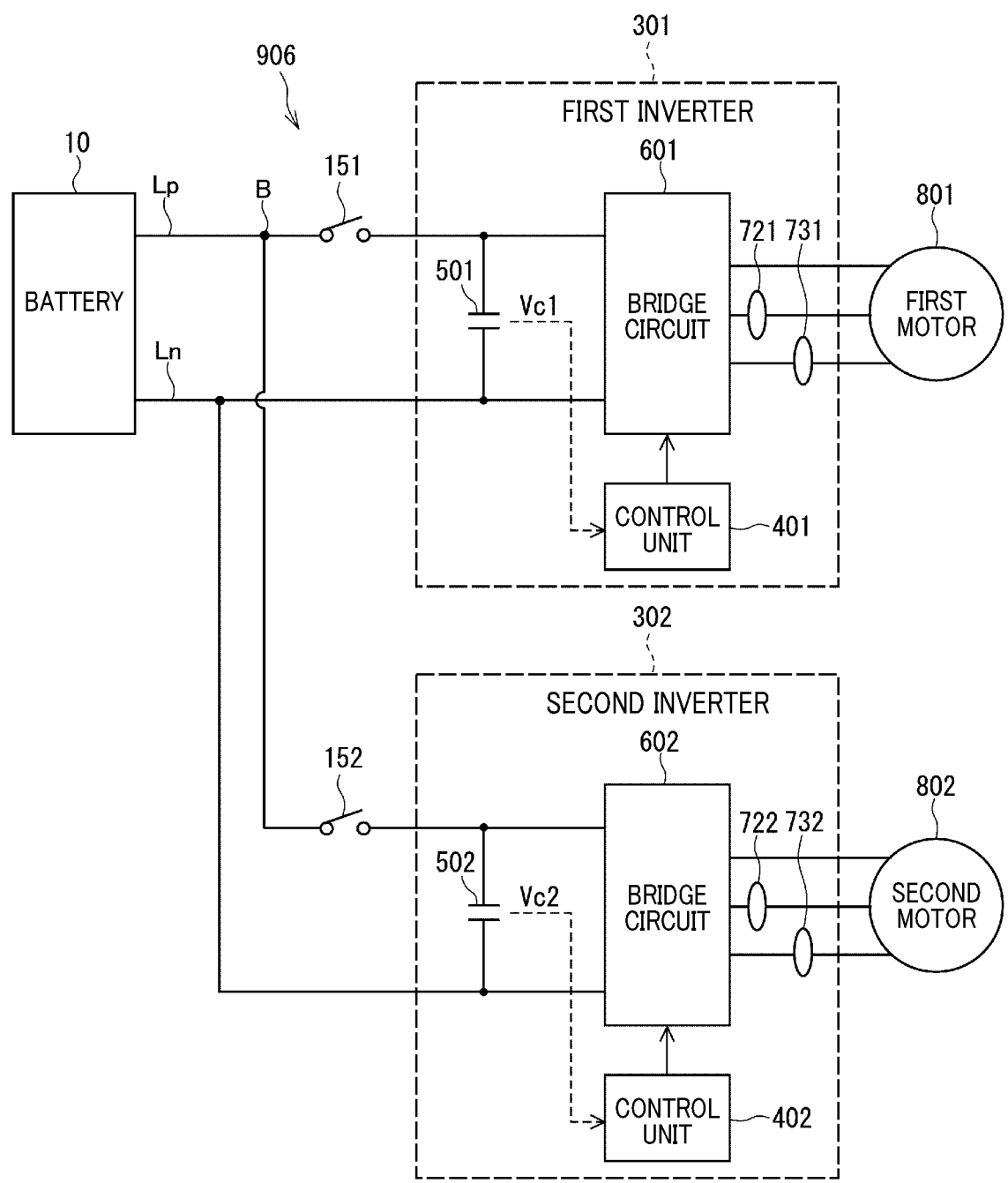
FIG. 16 is a diagram illustrating a configuration of an abnormality determination system according to a sixth embodiment.

FIG. 16 illustrates another configuration example of an abnormality determination system including a plurality of inverters as the sixth embodiment. An abnormality determination system 906 in the sixth embodiment includes a plurality of inverters 301 and 302 and a plurality of power source relays 151 and 152. The power source relays 151 and 152 are provided nearer the inverters 301 and 302 than the branch point B in the direct-current bus line Lp and can shut power supply from the battery 10 to respective bridge circuits 601 and 602 of the inverters 301 and 302. That is, this system configuration avoids the interference with abnormality detection.

In the abnormality determination system 906, a discharge process and an abnormality diagnosis of a shutdown function can be independently performed at the same time for each inverter corresponding to the opened power source relay. Therefore, unlike in the fourth and fifth embodiments, there is no need to perform the discharge processes and the abnormality diagnoses of the shutdown functions of the inverters 301 and 302 at different timings, thereby shortening the diagnosis time.

(Seventh Embodiment)

Figure 17:
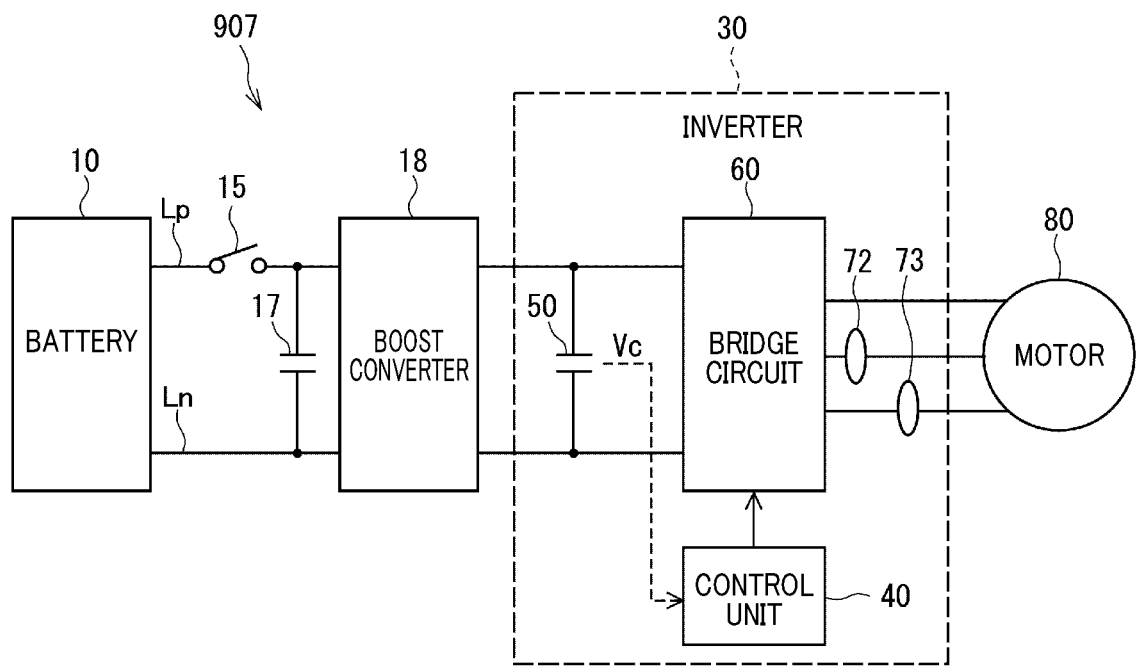
FIG. 17 is a diagram illustrating a configuration of an abnormality determination system according to a seventh embodiment.

Next, an abnormality determination system 907 in the seventh embodiment in which a boost converter 18 is provided between the battery 10 and one inverter 30 will be described with reference to FIG. 17. The boost converter 18 is configured by a known chopper circuit or the like including an inductor and a switching element, and raises the voltage of the battery 10 by a switching action and outputs the voltage to the inverter 30. A converter-preceding capacitor 17 is provided on the battery 10 side of the boost converter 18, separately from a smoothing capacitor 50 of the inverter 30. However, the converter-preceding capacitor 17 is not related to the "capacitor voltage Vc" for use in an abnormality diagnosis. The boost converter 18 is equivalent to an example of "another device 19" illustrated in FIG. 7.

The abnormality determination system 907 performs an abnormality diagnosis of a shutdown function of one inverter 30 by a method in conformity with the first to third embodiments. In this case, the abnormality determination system 907 stops the switching action of the boost converter 18 before performing the abnormality diagnosis of the shutdown function. This eliminates the influence of the voltage boosting and current consumption by the boost converter 18 on the capacitor voltage Vc.

(Eighth Embodiment)

Figure 18:
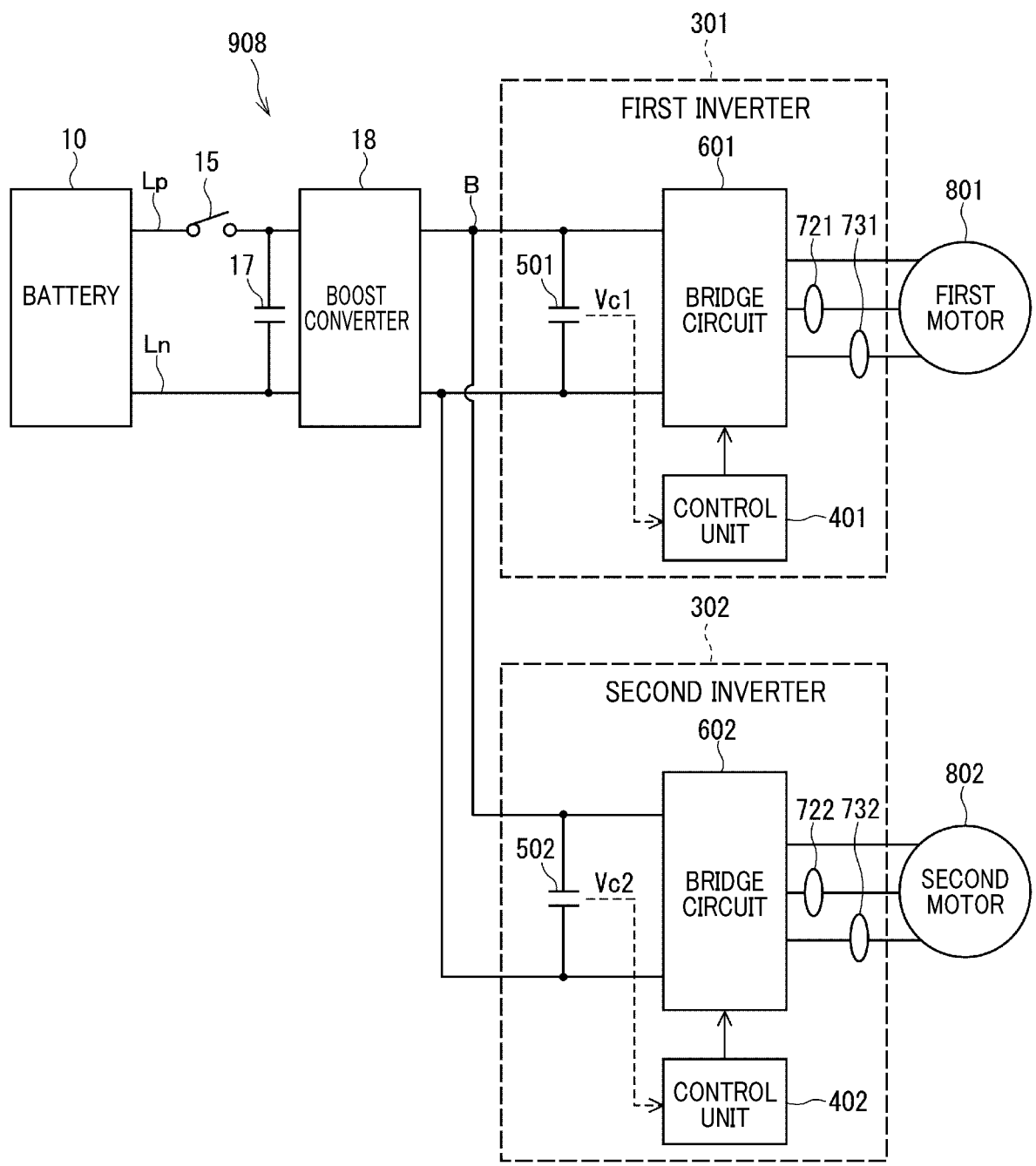
FIG. 18 a diagram illustrating a configuration of an abnormality determination system according to an eighth embodiment.

Next, an abnormality determination system 908 in the eighth embodiment in which the boost converter 18 is provided between the battery 10 and the plurality of inverters 301 and 302 will be described with reference to FIGS. 18 and 19. The configuration illustrated in FIG. 18 is equivalent to a configuration in which the boost converter 18 is provided between the power source relay 15 and the branch point B in the direct-current bus line Lp in the abnormality determination system 904 of the fourth embodiment illustrated in FIG. 12.

The abnormality determination system 908 performs abnormality diagnoses of shutdown functions of the plurality of inverters 301 and 302 by a method in conformity with the fourth to sixth embodiments. In this case, the abnormality determination system 908 stops the switching action of the boost converter 18 before performing the abnormality diagnoses of the shutdown functions. This eliminates the influence of the voltage boosting and current consumption by the boost converter 18 on capacitor voltages Vc1 and Vc2.

Figure 19:
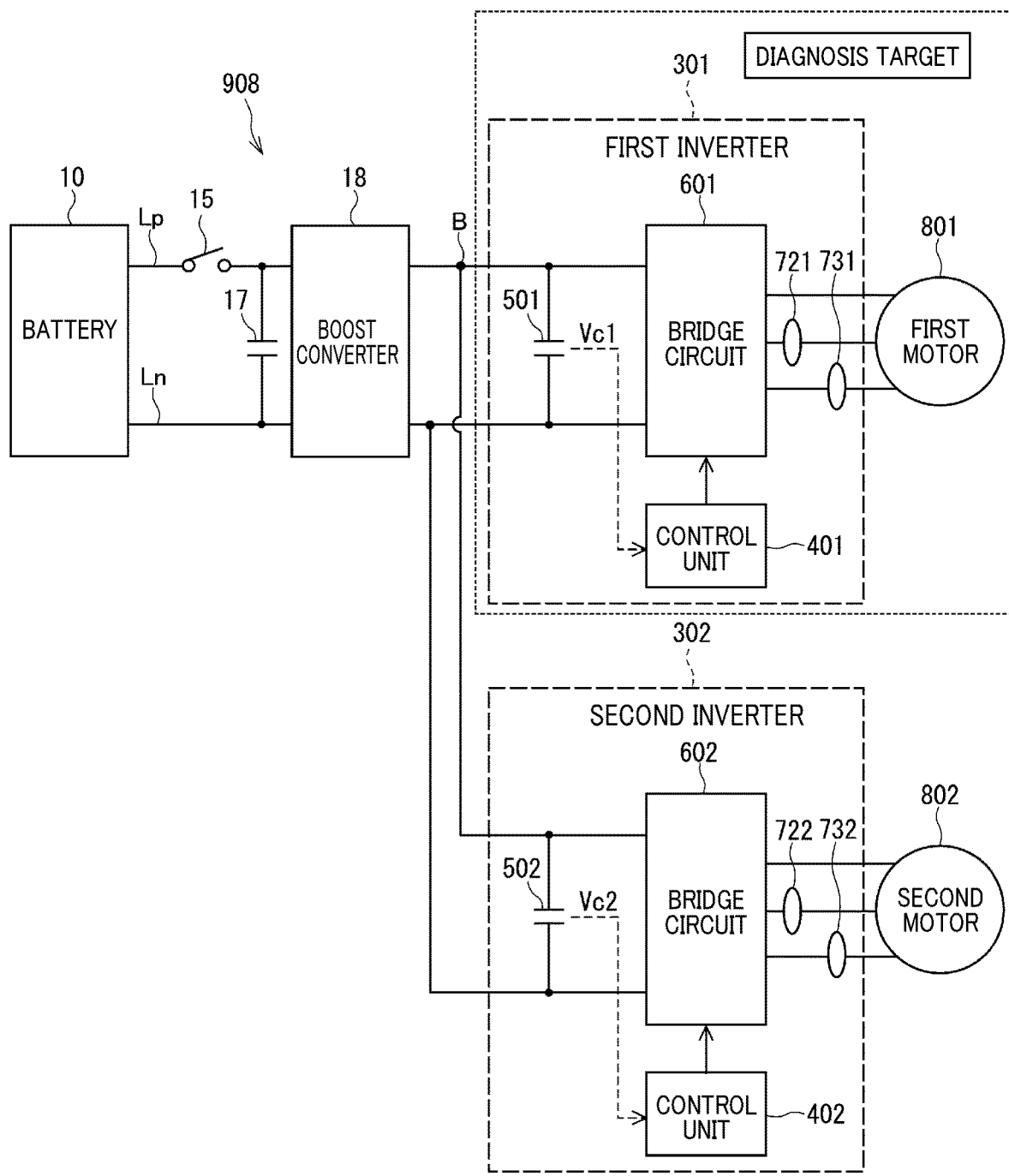
FIG. 19 is a diagram illustrating the abnormality determination system according to the eighth embodiment in which an inverter to be diagnosed is limited.

As illustrated in FIG. 19, in the abnormality determination system 908, the inverter to be diagnosed may be limited to one of the inverters (for example, the first inverter 301). When the inverter to be diagnosed is limited to one inverter, the abnormality determination system 908 performs the abnormality diagnosis of the shutdown function by a method in conformity with the first to third embodiments. Also in this case, the abnormality determination system 908 stops the switching action of the boost converter 18 before performing the abnormality diagnosis of the shutdown function. This eliminates the influence of the voltage boosting and current consumption by the boost converter 18 on the capacitor voltage Vc1.

(Other Embodiments)

(a) In the foregoing embodiments, the vehicle control unit 20 and the control unit 40 of the inverter 30 cooperate to implement the discharge process and the shutdown function. In this case, it can be designed as appropriate which of the functions is to be performed by which of the devices. For example, the control unit 40 may operate the power source relay 15 directly. Alternatively, the vehicle control unit 20 may include the function of the "control unit of an inverter".

(b) The supply source of direct-current power is not limited to a battery but may be a double-layer capacitor, a converter that rectifies alternating-current power and outputs direct-current power, or the like. Alternatively, a boost converter may be provided between the battery and the inverter as in the system described in Japanese Patent No. 5287705.

(c) The abnormality determination system of the present disclosure may not be necessarily applied to an inverter that supplies electric power to a motor of a vehicle but may be applied to an inverter that supplies electric power to a rotary electrical machine for any other purpose. In this case, instead of the "vehicle control unit" in the foregoing embodiments, a "centralized control unit" that manages operations of the entire system including an inverter and its peripherals may issue a discharge instruction or a diagnostic instruction.

It is to be noted that the present disclosure is not limited to the foregoing embodiments but can be implemented in various manners without deviating from the spirit of the present disclosure.

The control unit and the method described in the present disclosure may be implemented by a dedicated computer that is provided by configuring a processor programmed to execute one or more functions embodied by a computer program and a memory. Alternatively, the control unit and the control method described in the present disclosure may be implemented by a dedicated computer that is provided by configuring a processor by one or more dedicated hardware logical circuits. As another alternative, the control unit and the control method described in the present disclosure may be implemented by one or more dedicated computers configured by a combination of a processor programmed to execute one or more functions and a memory and a processor configured by one or more hardware logical circuits. In addition, the computer program may be stored in a computer-readable non-transitory tangible recording medium as instructions to be executed by a computer.

Hereinafter, an aspect of the above-described embodiments will be summarized.

An abnormality determination system of the present disclosure includes at least one inverter (30) and at least one power source relay (15). The inverter includes: a bridge circuit (60) in which a plurality of switching elements (61 to 66) are bridge-connected; a smoothing capacitor (50) that is provided at an input part of the bridge circuit; and a control unit (40) that controls driving of the bridge circuit. The inverter converts direct-current power input from a direct-current power supply source (10) to the bridge circuit to alternating-current power, and supplies the alternating-current power to a rotary electrical machine (80). The power source relay is provided between the direct-current power supply source and the smoothing capacitor and is capable of shutting off power supply from the direct-current power supply source to the bridge circuit.

The control unit includes a gate command section (44), a signal switching section (48), and an abnormality determination section (45). The gate command section generates a drive signal for driving gates of the plurality of switching elements in the bridge circuit. When the drive signal is input and no shutdown signal for stopping gate drive of the plurality of switching elements of the bridge circuit is input, the signal switching section outputs the drive signal to the bridge circuit. When the shutdown signal is input, the signal switching section stops output of the drive signal and activates the shutdown function of the inverter. The abnormality determination section determines an abnormality in the shutdown function.

When the power source relay is opened, the control unit drives the bridge circuit to start a discharge process of discharging electric charge from the smoothing capacitor, and activates the shutdown function during execution of the discharge process. When it is determined that a directly or indirectly detected voltage (Vc) of the smoothing capacitor has dropped during operation of the shutdown function, the abnormality determination section determines that the shutdown function is abnormal. The "indirect detection" means, for example, detecting a current flowing out from a high-potential electrode of the smoothing capacitor to the bridge circuit, that is, detecting the voltage of the smoothing capacitor.

In the abnormality determination system of the present disclosure, an abnormality in the shutdown function is determined based on only a drop in the voltage of the smoothing capacitor without using a current value of the current sensor unlike in the conventional technique described in Japanese Patent No. 5287705. This allows an appropriate abnormality diagnosis of the shutdown function even if the current sensor of one or more phases is at the approximately zero sticking fault.

In the conventional technique described in Japanese Patent No. 5287705, it is not specified which of the plurality of shutdown commands is abnormal. In addition, in the system configuration in which the system main relay is provided in common among the plurality of inverters immediately behind the electrical storage device, the motor currents of the inverters are input to the current detection section without timing differentiation. That is, no consideration is given to interference with abnormality detection in the plurality of shutdown commands or interference with abnormality detection among the plurality of inverters. In contrast to this, in the present disclosure, when a plurality of shutdown signals are subjected to abnormality diagnosis or when a plurality of inverters are subjected to abnormality diagnosis, the timings of the diagnosis are desirably shifted to avoid interference with abnormality detection.

What is claimed is:

1. An abnormality determination system comprising:
   at least one inverter that includes: a bridge circuit in which a plurality of switching elements are bridge-connected; a smoothing capacitor that is provided at an input part of the bridge circuit; and a control unit that controls driving of the bridge circuit, and converts direct-current power input from a direct-current power supply source to the bridge circuit to alternating-current power, and supplies the alternating-current power to a rotary electrical machine; and
   at least one power source relay that is provided between the direct-current power supply source and the smoothing capacitor and is capable of shutting off power supply from the direct-current power supply source to the bridge circuit, wherein
   the control unit includes: a gate command section that generates a drive signal for driving gates of the plurality of switching elements in the bridge circuit; a signal switching section that, when the drive signal is input to the signal switching section, and no shutdown signal for stopping gate drive of the plurality of switching elements of the bridge circuit is input to the signal switching section, outputs the drive signal to the bridge circuit, and when the shutdown signal is input to the signal switching section, stops output of the drive signal and activates a shutdown function, of the inverter, for stopping the gate drive of the plurality of switching elements of the bridge circuit; and an abnormality determination section that determines an abnormality in the shutdown function, and
   when the power source relay is opened, the control unit drives the bridge circuit to start a discharge process of discharging electric charge from the smoothing capacitor, and the signal switching section of the control unit activates the shutdown function during execution of the discharge process, and when a directly or indirectly detected voltage of the smoothing capacitor has dropped during operation of the shutdown function, the abnormality determination section determines that the shutdown function is abnormal.

2. The abnormality determination system according to claim 1, wherein, when it is determined that the voltage of the smoothing capacitor is maintained in a period between the start of the discharge process and the activation of the shutdown function, the abnormality determination section determines that the discharge function of the inverter is abnormal.

3. The abnormality determination system according to claim 1, wherein
   the signal switching section activates the shutdown function based on any one or more of the plurality of input shutdown signals, and
   the abnormality determination section determines an abnormality in the plurality of shutdown signals based on a voltage drop in the smoothing capacitor in a period during which each of the shutdown signals is applied in a mutually exclusive manner.

4. The abnormality determination system according to claim 1, wherein
   the at least one inverter includes a plurality of inverters, and
   the control units of the inverters perform the discharge process and an abnormality diagnosis of the shutdown function at different timings.

5. The abnormality determination system according to claim 4, wherein, after the opening of the power source relay, the control units of the inverters perform the discharge processes and the abnormality diagnoses of the shutdown functions of the inverters one by one in sequence.

6. The abnormality determination system according to claim 4, wherein the control units of the inverters perform the discharge processes and the abnormality diagnoses of the shutdown functions of one or more inverters selected in sequence corresponding to one relay opening action.

7. The abnormality determination system according to claim 1, wherein
   the at least one inverter includes a plurality of inverters, and
   the at least one power source relay includes a plurality of power source relays that are capable of individually shutting off the power supply from the bridge circuits of the inverters.

8. The abnormality determination system according to claim 1, further comprising:
   a boost converter that is provided between the direct-current power supply source and the inverter to raise a voltage of the direct-current power supply source and output the voltage to the inverter, wherein
   an operation of the boost converter is stopped before an abnormality diagnosis of the shutdown function.

* * * * *